United States Patent
Lane et al.

(10) Patent No.: US 11,437,684 B2
(45) Date of Patent: Sep. 6, 2022

(54) COATINGS, COATED SEPARATORS, BATTERIES, AND RELATED METHODS

(71) Applicant: CELGARD, LLC, Charlotte, NC (US)

(72) Inventors: Michael B. Lane, Charlotte, NC (US); Insik Jeon, Weddington, NC (US); Edward Kruger, Charlotte, NC (US); Xiang Yu, Indian Land, SC (US); Ronnie E. Smith, Huntersville, NC (US); Stefan Reinartz, Waxhaw, NC (US); Junqing Ma, Charlotte, NC (US)

(73) Assignee: Celgard, LLC, Charlotte, NC (US)

( * ) Notice: Subject to any disclaimer, the term of this patent is extended or adjusted under 35 U.S.C. 154(b) by 626 days.

(21) Appl. No.: 16/318,405

(22) PCT Filed: Jul. 21, 2017

(86) PCT No.: PCT/US2017/043266
§ 371 (c)(1),
(2) Date: Jan. 17, 2019

(87) PCT Pub. No.: WO2018/017944
PCT Pub. Date: Jan. 25, 2018

(65) Prior Publication Data
US 2020/0335759 A1 Oct. 22, 2020

Related U.S. Application Data

(60) Provisional application No. 62/365,780, filed on Jul. 22, 2016.

(51) Int. Cl.
*H01M 50/449* (2021.01)
*C09D 7/65* (2018.01)
(Continued)

(52) U.S. Cl.
CPC ............ *H01M 50/449* (2021.01); *C09D 5/18* (2013.01); *C09D 7/20* (2018.01); *C09D 7/65* (2018.01);
(Continued)

(58) Field of Classification Search
CPC ............ H01M 50/449; H01M 50/411; H01M 10/0525; H01M 2220/20; C09D 7/65;
(Continued)

(56) References Cited

U.S. PATENT DOCUMENTS 6,432,586 B1   8/2002   Zhang
6,602,593 B1   8/2003   Callahan et al.
(Continued)

OTHER PUBLICATIONS

R. Kesting, "Synthetic Polymeric Membranes, A Structural Perspective," 2 ed., John Wiley & Sons (New York, NY), (1985), pp. 290-297.

*Primary Examiner* — Ling Siu Choi
*Assistant Examiner* — Ronald Grinsted
(74) *Attorney, Agent, or Firm* — Hammer & Associates, P.C.

(57) ABSTRACT

New and/or improved coatings for porous substrates, including battery separators or separator membranes, and/or coated porous substrates, including coated battery separators, and/or batteries or cells including such coatings or coated separators, and/or related methods including methods of manufacture and/or of use thereof are disclosed. Also, new or improved coatings for porous substrates, including battery separators, which comprise at least a polymeric binder and heat-resistant particles with or without additional additives, materials or components, and/or to new or improved coated porous substrates, including battery separators, where the coating comprises at least a polymeric binder and heat-resistant particles with or without additional additives, materials or components are disclosed. Further, (Continued)

new or improved coatings for porous substrates, including battery separators, and new and/or improved coated porous substrates, including battery separators, new or improved coatings for porous substrates, including battery separators, which comprise at least (i) a polymeric binder, (ii) heat-resistant particles, and (iii) at least one component selected from the group consisting of a cross-linker, a low-temperature shutdown agent, an adhesion agent, and a thickener, and new and/or improved coated porous substrates, including battery separators, where the coating comprises at least (i) a polymeric binder, (ii) heat-resistant particles, and (iii) at least one component selected from the group consisting of a cross-linker, a low-temperature shutdown agent, an adhesion agent, a thickener, a friction-reducing agent, a high-temperature shutdown agent are disclosed.

33 Claims, 13 Drawing Sheets

(51) Int. Cl.
*C09D 7/20* (2018.01)
*C09D 5/18* (2006.01)
*C09D 129/04* (2006.01)
*C09D 133/04* (2006.01)
*C09D 139/04* (2006.01)
*H01M 10/0525* (2010.01)
*H01M 50/411* (2021.01)

(52) U.S. Cl.
CPC .......... *C09D 129/04* (2013.01); *C09D 133/04* (2013.01); *C09D 139/04* (2013.01); *H01M 10/0525* (2013.01); *H01M 50/411* (2021.01); *H01M 2220/20* (2013.01)

(58) Field of Classification Search
CPC .......... C09D 7/20; C09D 5/18; C09D 129/04; C09D 133/04; C09D 139/04
USPC ........................................................ 429/144
See application file for complete search history.

(56) References Cited

U.S. PATENT DOCUMENTS

2014/0045033 A1 2/2014 Zhang et al.
2014/0370361 A1* 12/2014 Cheong ................. H01M 4/386
429/144

* cited by examiner

Schematic Sectional Figures

One side coated:

Two side coated:

US 11,437,684 B2

COATINGS, COATED SEPARATORS, BATTERIES, AND RELATED METHODS

CROSS REFERENCE TO RELATED APPLICATIONS

This application claims priority to and the benefit of International Patent Application Serial No. PCT/US2017/043266 filed Jul. 21, 2017 which claimed priority to and the benefit of U.S. Provisional Patent Application Ser. No. 62/365,780, filed Jul. 22, 2016, both of which are hereby fully incorporated by reference herein.

FIELD

This application is directed to new and/or improved coatings for porous substrates, including battery separators or separator membranes, and/or coated porous substrates, including coated battery separators, and/or batteries or cells including such coatings or coated separators, and/or related methods including methods of manufacture and/or of use thereof. In accordance with at least particular embodiments, this application is directed to new or improved coatings for porous substrates, including battery separators, which comprise at least a polymeric binder and heat-resistant particles with or without additional additives, materials or components, and/or to new or improved coated porous substrates, including battery separators, where the coating comprises at least a polymeric binder and heat-resistant particles with or without additional additives, materials or components. In accordance with at least certain embodiments, this application is directed to new or improved coatings for porous substrates, including battery separators, and new and/or improved coated porous substrates, including battery separators, and more particularly, to new or improved coatings for porous substrates, including battery separators, which comprise at least (i) a polymeric binder, (ii) heat-resistant particles, and (iii) at least one component selected from the group consisting of a cross-linker, a low-temperature shutdown agent, an adhesion agent, and a thickener, and/or to new and/or improved coated porous substrates, including battery separators, where the coating comprises at least (i) a polymeric binder, (ii) heat-resistant particles, and (iii) at least one component selected from the group consisting of a cross-linker, a low-temperature shutdown agent, an adhesion agent, a thickener, a friction-reducing agent, a high-temperature shutdown agent.

BACKGROUND

As technological demands increase, demands on separator performance, quality, and manufacture also increase. Various techniques have been developed to improve the performance properties of membranes or porous substrates used as separators in lithium batteries.

Applications of polymeric coatings and ceramic-containing polymeric coatings are known methods to improve the thermal safety performance of a microporous battery separator membrane in a lithium battery. Such coatings may be applied as a coating or a layer onto one or both sides of a microporous battery separator membrane in order to promote high-temperature stability, control oxidation at the separator-cathode interface of the microporous battery separator membrane, and improve safety performance of the microporous battery separator membrane in various battery systems, such as lithium ion rechargeable (or secondary) battery systems. U.S. Pat. No. 6,432,586, which is incorporated herein by reference in its entirety, discloses various ceramic-coated separators. Additionally, U.S. Patent Publication No. 2014/0045033, which is also incorporated herein by reference in its entirety, discloses various ceramic particle-containing polymeric coatings for microporous battery separator membranes which may provide improvement in safety, battery cycle life, and high temperature performance. Such coatings may include one or more polymeric binders, one or more types of inorganic ceramic particles and an aqueous solvent, a non-aqueous solvent, or water. Such coatings may be applied using various technologies such as, but not limited to, dip coating, knife, gravure, curtain, spray, etc. Furthermore, various known ceramic particle-containing polymeric coatings may be applied at varying thicknesses, such as a thickness of, for example, 2 to 6 microns onto one or both sides of a microporous battery separator membrane.

Increasing performance standards, safety standards, manufacturing demands, and/or environmental concerns make development of new and/or improved coating compositions for battery separators desirable.

One major safety issue for lithium-ion batteries is thermal runaway. Abuse conditions, such as overcharge, over-discharge, and internal short-circuits, for example, can lead to battery temperatures far above those which the temperatures that battery manufacturers intended their batteries to be used. Shutdown of the battery, e.g., a stopping of ionic flow across the separator, e.g., between an anode and a cathode in the event of thermal runaway, is a safety mechanism used to prevent thermal runaway. Separators in lithium-ion batteries must offer the ability to shutdown at temperatures at least slightly lower than that at which thermal runaway occurs, while still retaining their mechanical properties. Faster shutdown at lower temperatures and for a longer duration, e.g., so that the user or device has longer time to turn off the system, is very desirable.

Another major safety issue for lithium-ion batteries are shorts (hard or soft) caused when the electrodes contact each other. A hard short may occurs if the electrodes come into direct contact with each other and may also occur when a lot of (maybe 100) or very large lithium dendrites, growing from the anode, come into contact with the cathode. The result may be thermal runaway. A soft short may occur when small or a single (or a small number, like 5) lithium dendrite growing from the anode comes into contact with the cathode. Soft shorts may reduce the cycling efficiency of the battery. Past ceramic-coated separators are good at preventing hard and soft shorts, but there is a constant desire to improve this function of separators. For example, it is desirable to maintain this function with thinner and thinner coatings.

Hence, there is a need for improvements in at least the performance, safety, manufacture, etc. of past coating compositions and coated battery separators.

SUMMARY

In accordance with at least selected embodiments, this application, disclosure or inventions herein or covered hereby may address the prior issues, needs or problems, and/or may provide or is or are directed to new and/or improved coatings for porous substrates, including battery separators or separator membranes, and/or coated porous substrates, including coated battery separators, and/or batteries or cells including such coatings or coated separators, and/or related methods including methods of manufacture and/or of use thereof. In accordance with at least particular embodiments, this application, disclosure or inventions herein or covered hereby is or are directed to new or improved coatings for porous substrates, including battery separators, which comprise at least a polymeric binder and heat-resistant particles with or without additional additives, materials or components, and/or to new or improved coated porous substrates, including battery separators, where the coating comprises at least a polymeric binder and heat-resistant particles with or without additional additives, materials or components. In accordance with at least certain embodiments, this application is directed to new or improved coatings for porous substrates, including battery separators, and new and/or improved coated porous substrates, including battery separators, and more particularly, to new or improved coatings for porous substrates, including battery separators, which comprise at least (i) a polymeric binder, (ii) heat-resistant particles, and (iii) at least one component selected from the group consisting of a cross-linker, a low-temperature shutdown agent, an adhesion agent, and a thickener, and/or to new and/or improved coated porous substrates, including battery separators, where the coating comprises at least (i) a polymeric binder, (ii) heat-resistant particles, and (iii) at least one component selected from the group consisting of a cross-linker, a low-temperature shutdown agent, an adhesion agent, a thickener, a friction-reducing agent, a high-temperature shutdown agent.

In one aspect, a coating composition, e.g., a coating composition for use on at least one side of a porous substrate such as a battery separator is described herein. The coating may also be suitable for other purposes where its properties, which are discussed in further detail below with respect to its application to battery separators, would make it a suitable coating option. The coating composition comprises: (i) a polymeric binder, (ii) heat-resistant particles, and (iii) at least one additional component selected from the group consisting of (a) a cross-linker, (b) a low-temperature shutdown agent, (c) an adhesion agent, (d) a thickener, (e) a friction-reducing agent, and (f) a high-temperature shutdown agent. In some embodiments, the binder further comprises water as the only solvent, an aqueous solvent, or a non-aqueous solvent. In some embodiments, the coating compositions may also comprise at least one selected from the group consisting of surfactants, antioxidants, fillers, colorants, stabilizing agents, de-foaming agents, de-bubbling agents, thickeners, emulsifiers, pH buffers, emulsification agents, surfactants, anti-settling agents, levelers, rheology modifiers, and wetting agents.

In another aspect, a separator, e.g., for a battery, such as a lithium battery, secondary lithium battery, lithium ion battery, secondary lithium ion battery, or the like, that comprises a porous substrate and a coating layer formed on at least one surface thereof is described. The coating composition comprises the coating composition described herein. In some embodiments, the coating layer is an outermost coating layer, and in other embodiments, a different coating layer is formed over or on top of the coating layer, and in this case, the different coating layer is the outermost layer or may have yet another different coating layer formed over or on top of it. In some embodiments the coating layer comprising the coating composition described herein is coated on two surfaces of, e.g., two opposing surfaces of, the porous substrate.

In a further aspect, a composite comprising a the separator described herein, in direct contact with an electrode for a lithium ion battery, a secondary lithium ion battery comprising the separator described herein, and/or a device or vehicle comprising the separator described herein or a secondary lithium ion battery comprising the separator described herein are described. The secondary lithium ion battery exhibits at least improved safety and performance.

DRAWINGS

Figure 3:
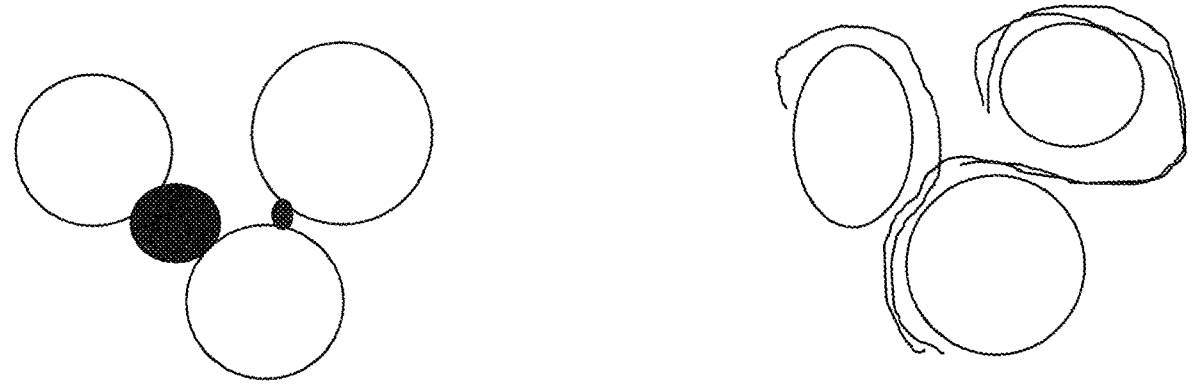

FIG. 3 is a schematic diagram of selected coverage of the heat-resistant particles by the polymeric binder. For example, when the ratio of heat-resistant particles to polymeric binder is lower, there will be more coverage of the heat-resistant particles with binder (e.g., as shown on the right in FIG. 3), and when the ratio of heat-resistant particles to polymeric binder is higher, there will be less coverage of the heat-resistant particles, e.g., as shown on the left in FIG. 3).

Figure 4:
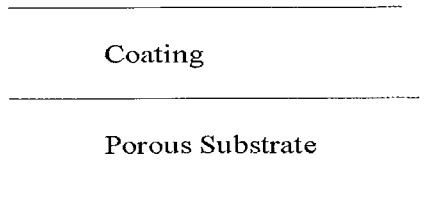
Figure 4:
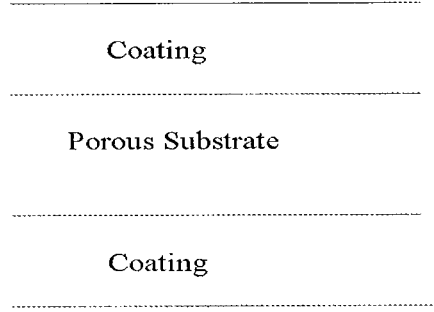

FIG. 4 is schematic cross-section illustrations of respective one side coated (OSC) and two side coated (TSC) embodiments of inventive coated substrates or coated separators.

Figure 5:
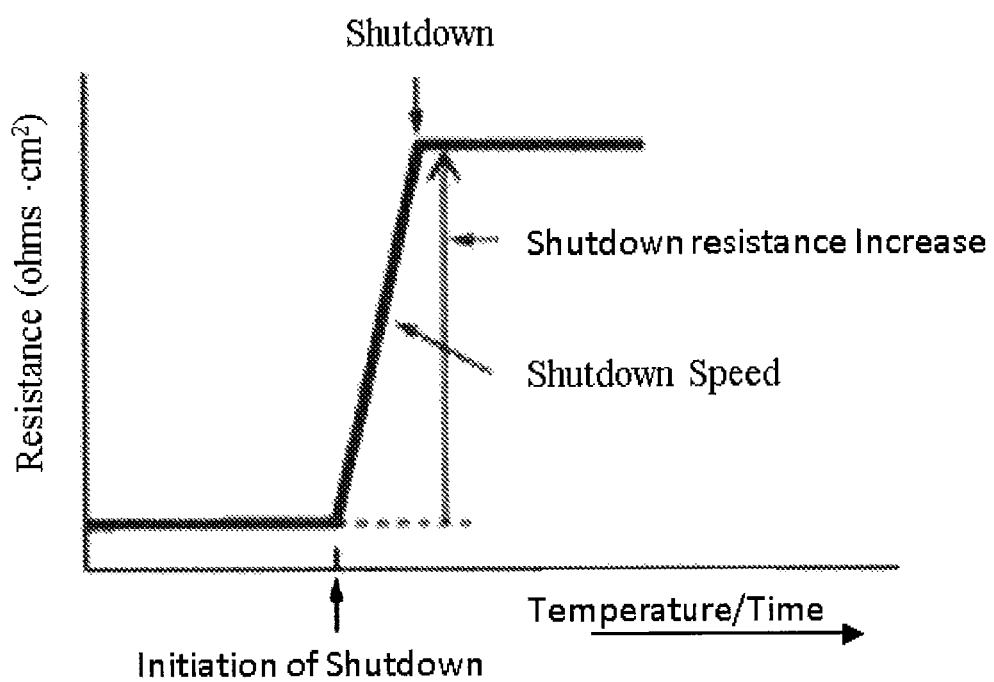

FIG. 5 is a graphical representation of one example of shutdown performance with resistance on one axis and temperature on the other axis.

Figure 6:
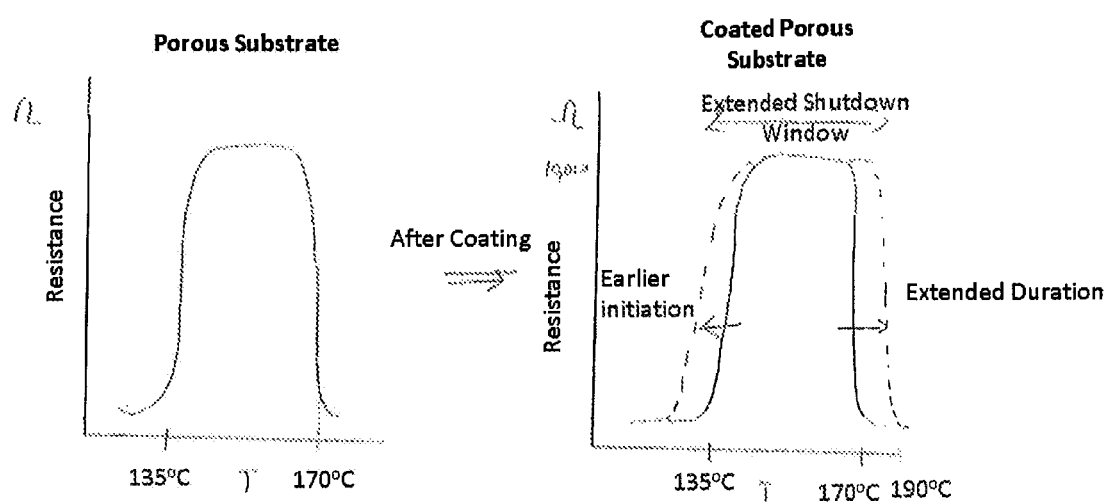

FIG. 6 is a schematic graphical representation of the shutdown window of respective uncoated and one side coated substrates. The coated substrate has an extended shutdown window.

Figure 7:
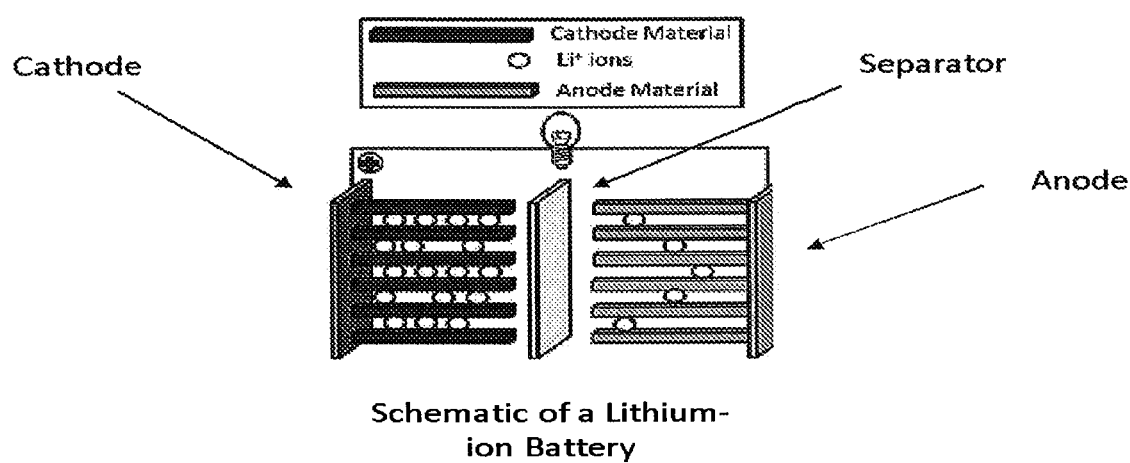

FIG. 7 is a schematic illustration of a lithium battery.

Figure 8:
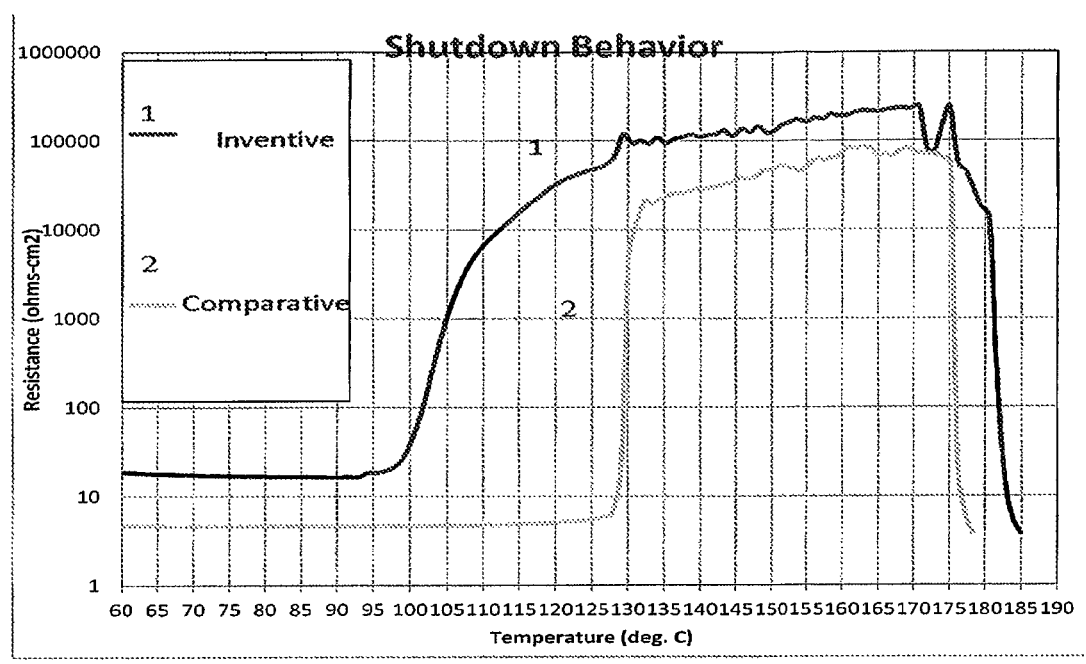

FIG. 8 is a graphical representation of shutdown performance of respective Comparative and Inventive examples.

Figure 9:
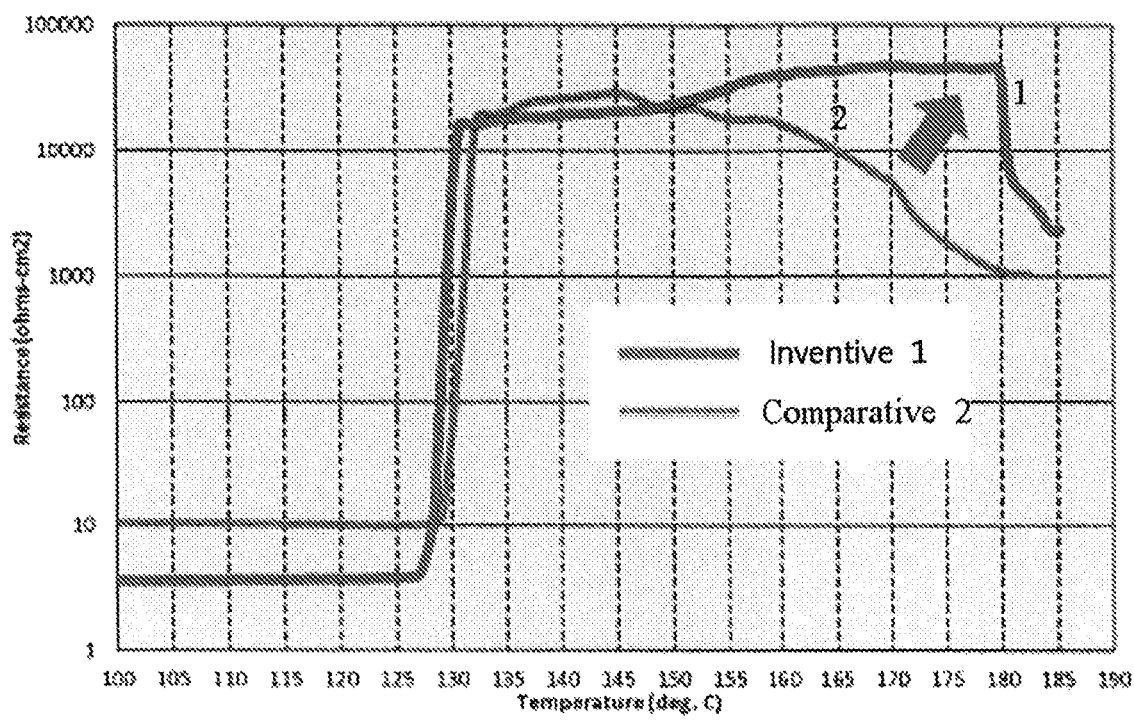

FIG. 9 is a graphical representation of extended shutdown performance of an Inventive example as compared to a Comparative example.

Figure 10:
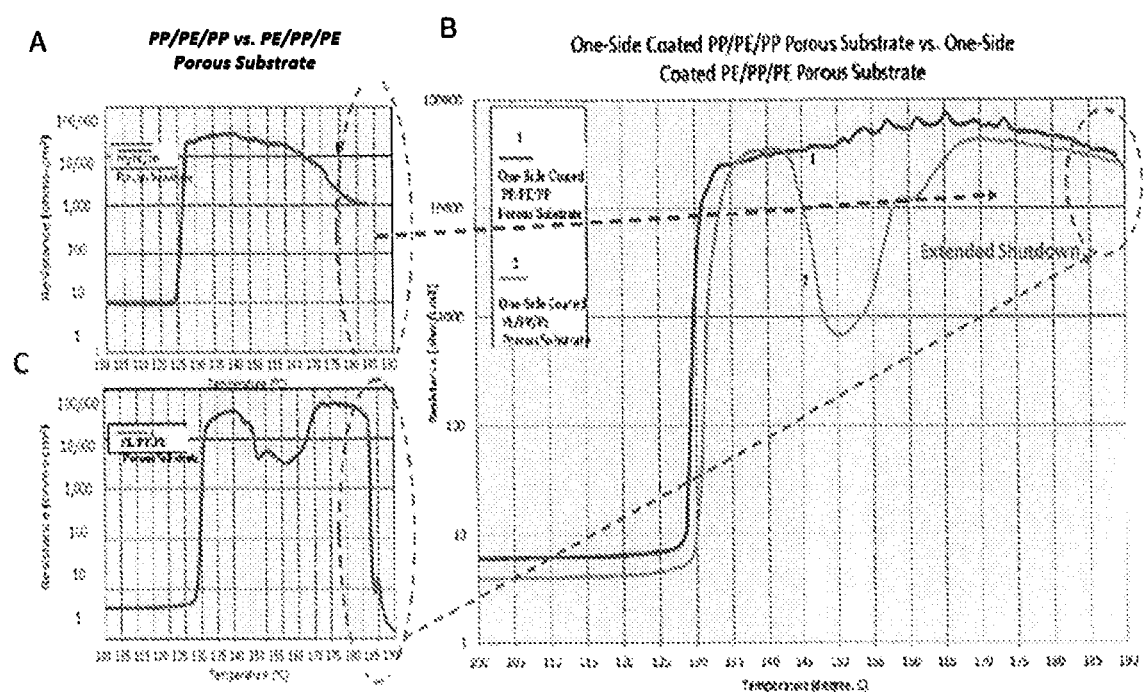

FIGS. 10A, 10B and 10C are each graphical representations of shutdown performance of respective uncoated and coated PP/PE/PP and PE/PP/PE substrates.

Figure 11:
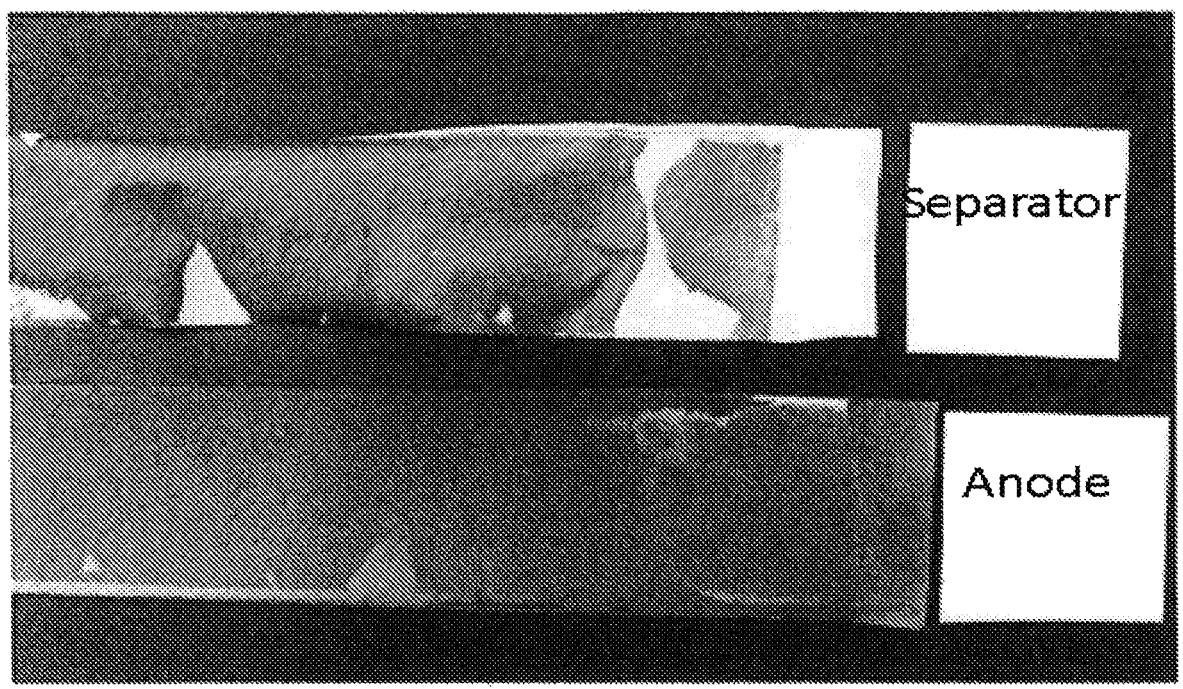

FIG. 11 is a photographic image showing increased adhesion of the coating layer to an electrode, e.g., an anode, by addition of an adhesion agent to the coating composition.

Figure 12:
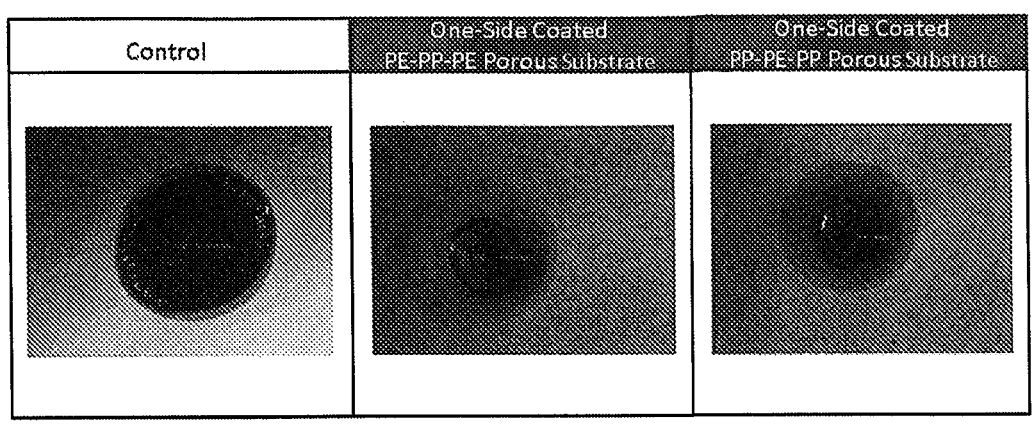

FIG. 12 is a photographic image showing the results of a hot tip hole propagation study. The hot tip test measures the dimensional stability of the separators under point heating condition. The test involves contacting the separators with a hot soldering iron tip and measuring the resulting hole. Smaller holes are more desirable.

Figure 13:
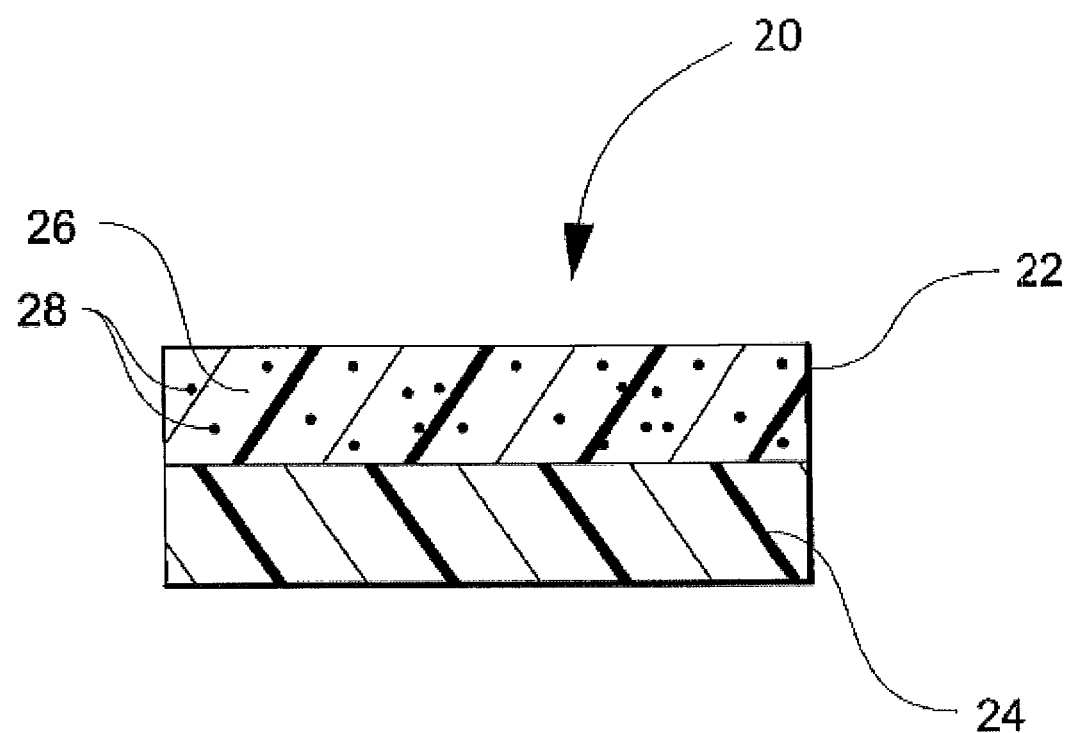

FIG. 13 is a schematic cross-section illustration of an exemplary ceramic coated separator.

DETAILED DESCRIPTION

Compositions

In one aspect, a coating composition described herein comprises, consists of, or consists essentially of the following: (1) a polymeric binder, optionally comprising water as the only solvent, an aqueous solvent, or a non-aqueous solvent; (2) heat-resistant particles; and (3) at least one additional component selected from the group consisting of: (a) a cross-linker, (b) a low-temperature shutdown agent, (c) an adhesion agent, (d) a thickener, (e) a friction-reducing agent, and (f) a high-temperature shutdown agent.

In some embodiments, the coating composition comprises at least two additional of these additional components, e.g., (a) and (d), (b) and (c), (c) and (e), or (d) and (f) in some embodiments the coating composition comprises at least three of these additional components, e.g., (a), (b), and (d), (a), (c), and (d), or (c), (e), and (f), and in other embodiments the coating composition comprises one of each of these additional components, e.g., (a), (b), (c), (d), (e), and (f). In some embodiments, the coating composition can comprise two component (a) s, e.g., two cross-linkers, and one of component (b). Alternatively, the coating composition can comprise three component (c) s, e.g., three adhesion agents, and one of component (d). In some coating compositions, a single added component can, for example, act as the adhesion agent and the low-temperature shutdown agent, and in other embodiments, the adhesion agent and the low-temperature shutdown agent are different compounds. The coating composition can comprise any possible combination of additional components (a), (b), (c), (d), (e), and (f).

(1) Polymeric Binder

The polymeric binder comprises, consists of, or consists essentially of at least one of a polymeric, oligomeric, or elastomeric material and the same are not so limited. Any polymeric, oligomeric, or elastomeric material not inconsistent with this disclosure may be used. The binder may be ionically conductive, semi-conductive, or non-conductive. Any gel-forming polymer suggested for use in lithium polymer batteries or in solid electrolyte batteries may be used. For example, the polymeric binder may comprise at least one, or two, or three, etc. selected from a polylactam polymer, polyvinyl alcohol (PVA), Polyacrylic acid (PAA), Polyvinyl acetate (PVAc), carboxymethyl cellulose (CMC), an isobutylene polymer, an acrylic resin, latex, an aramid, or any combination of these materials.

In some preferred embodiments, the polymeric binder comprises, consists of, or consists essentially of a polylactam polymer, which is a homopolymer, co-polymer, block polymer, or block co-polymer derived from a lactam. In some embodiments, the polymeric material comprises a homopolymer, co-polymer, block polymer, or block co-polymer according to Formula (1):

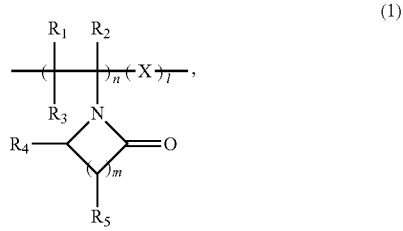

wherein $R_1$, $R_2$, $R_3$, and $R_4$ can be alkyl or aromatic substituents and $R_5$ can be an alkyl substituent, an aryl substituent, or a substituent comprising a fused ring; and wherein the preferred polylactam can be a homopolymer or a co-polymer where co-polymeric group X can be derived from a vinyl, a substituted or un-substituted alkyl vinyl, a vinyl alcohol, vinyl acetate, an acrylic acid, an alkyl acrylate, an acrylonitrile, a maleic anhydride, a maleic imide, a styrene, a polyvinylpyrrolidone (PVP), a polyvinylvalerolactam, a polyvinylcaprolactam (PVCap), polyamide, or a polyimide; wherein m can be an integer between 1 and 10, preferably between 2 and 4, and wherein the ratio of 1 to n is such that $0 \le 1:n \le 10$ or $0 \le 1:n \le 1$. In some preferred embodiments, the homopolymer, co-polymer, block polymer, or block co-polymer derived from a lactam is at least one, at least two, or at least three, selected from the group consisting of polyvinylpyrrolidone (PVP), polyvinylcaprolactam (PVCap), and polyvinyl-valerolactam.

Figure 1:
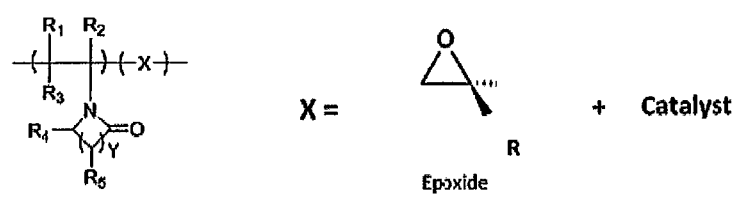
FIG. 1 is a structure description of a co-polymer or block-copolymer where X is a group capable of creating cross-linking between at least two co-polymers or block co-polymers chains, e.g., an epoxide or alkyl amine-containing group, and one embodiment of the co-polymer block co-polymer is derived from a lactam.
Figure 2:
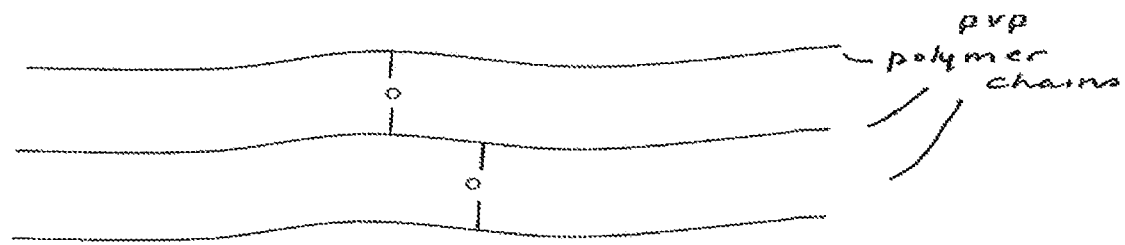
FIG. 2 is a schematic representation of an example of cross-linking between at least two co-polymers or block co-polymers chains created by the co-polymer block co-polymer derived from a lactam in FIG. 1 and the polymer chains are PVP chains so $R_1$, $R_2$, $R_3$, $R_4$, and $R_5$ in FIG. 1 are hydrogen and Y is 2.

In a preferred embodiment, a co-polymer block co-polymer derived from a lactam comprises, in its backbone, a group capable of creating cross-linking between at least two co-polymers or block co-polymers chains. For example, the group may be an epoxide group or an alkyl amine. When the group capable of creating cross-linking between at least two co-polymers or block co-polymers chains is an epoxide, the epoxide undergoes an epoxidation reaction to create the cross-linking. In some embodiments, addition of a catalyst is required. For example, if the group capable of creating cross-linking between at least two co-polymers or block co-polymers chains is an epoxide, catalyst comprising an alkyl amine group may be added, and if the group is an alkyl amine, a catalyst comprising an epoxide group may be added. A co-polymer or block-copolymer described in this paragraph may have a structure as shown in FIG. 1), where X is a group capable of creating cross-linking between at least two co-polymers or block co-polymers chains, e.g., an epoxide or alkyl amine-containing group. One embodiment of the co-polymer block co-polymer derived from a lactam described in this paragraph is shown in FIG. 1 below:

An example of cross-linking between at least two co-polymers or block co-polymers chains created by the co-polymer block co-polymer derived from a lactam in FIG. 1 is shown in FIG. 2.

In FIG. 2 the polymer chains are PVP chains so $R_1$, $R_2$, $R_3$, $R_4$, and $R_5$ in FIG. 1 are hydrogen and Y is 2. Use of a co-polymer or block-co-polymer derived from a lactam that comprises, in its backbone, a group capable of creating cross-linking between at least two co-polymers or block co-polymers chain can increase thermal stability, increase electrolyte stability, improve wetting, and CV performance of a resulting coating layer.

In another preferred embodiment, the polymeric binder comprises, consists of, or consists essentially of polyvinyl alcohol (PVA). Use of PVA may result in a low curl coating layer, which helps the substrate to which is it applied stay stable and flat, e.g., helps prevent the substrate from curling. PVA may be added in combination with any other polymeric, oligomeric, or elastomeric material described herein, particularly if low curling is desired.

In another preferred embodiment, the polymeric binder may comprise, consist of, or consists essentially of an acrylic resin. The type of acrylic resin is not particularly limited, and may be any acrylic resin that would not be contrary to the goals stated herein, e.g., providing a new and improved coating composition that may, for example, be used to make battery separators having improved safety. For example, the acrylic resin may be at least one, or two, or three, or four selected from the group consisting of polyacrylic acid (PAA), polymethylmethacrylate (PMMA), polyacrylonitrile (PAN), polymethyl acrylate (PMA).

In other preferred embodiments, the polymeric binder may comprise, consist of, or consist essentially of carboxymethyl cellulose (CMC), an isobutylene polymer, latex, or any combination these. These may be added alone or together with any other suitable oligomeric, polymeric, or elastomeric material.

In some embodiments, the polymeric binder may comprise a solvent that is water only, an aqueous or water-based solvent, and/or a non-aqueous solvent. When the solvent is water, in some embodiments, no other solvent is present. The aqueous or water-based solvent may comprise a majority (more than 50%) water, more than 60% water, more than 70% water, more than 80% water, more than 90% water, more than 95% water, or more than 99%, but less than 100% water. The aqueous or water-based solvent may comprise, in addition to water, a polar or non-polar organic solvent. The non-aqueous solvent is not limited and may be any polar or non-polar organic solvent compatible with the goals expressed in this application. In some embodiments, the polymeric binder comprises only trace amounts of solvent, and in other embodiments it comprises 50% or more solvent, sometimes 60% or more, sometimes 70% or more, sometimes 80% or more, etc.

The ratio of heat-resistant particles to polymeric binder in the coating composition is, in some embodiments, 50:50 to 99:1, in other embodiments, it is 70:30 to 99:1 or 90:1 to 98:2, and in further embodiments, it is 90:10 to 99:1. This ratio affects coverage of the heat-resistant particles by the polymeric binder. For example, when the ratio of heat-resistant particles to polymeric binder is lower, there will be more coverage of the heat-resistant particles with binder (e.g., as shown on the right in FIG. 3), and with the ratio of heat-resistant particles to polymeric binder is higher, there will be less coverage of the heat-resistant particles, e.g., as shown on the left in FIG. 3).

In a preferred embodiment, at least one of the heat-resistant particles is coated or partially-coated by the polymeric binder. For example, in some embodiments, 0.01 to 99.99% of the surface area of at least one of the heat-resistant particles (or of the surface area of all of the heat-resistant particles) is coated by the binder. In some embodiments, 0.01 to 99.99% of the total surface area of the heat-resistant particles in the composition is coated with polymeric binder.

(2) Heat-Resistant Particles

In another aspect, heat-resistant particles are added to the coating composition described herein. The size, shape, chemical composition, etc. of these heat-resistant particles is not so limited. The heat-resistant particles may comprise an organic material, an inorganic material, e.g., a ceramic material, or a composite material that comprises both an inorganic and an organic material, two or more organic materials, and/or two or more inorganic materials.

In some embodiments, heat-resistant means that the material that the particles are made up of, which may include a composite material made up of two or more different materials, does not undergo substantial physical changes, e.g., deformation, at temperatures of 200° C. Exemplary materials include aluminum oxide ($Al_2O_3$), silicon dioxide ($SiO_2$), graphite, etc.

Non-limiting examples of inorganic materials that may be used to form the heat-resistant particles disclosed herein are as follows: iron oxides, silicon dioxide ($SiO_2$), aluminum oxide ($Al_2O_3$), boehmite (Al(O)OH), zirconium dioxide ($ZrO_2$), titanium dioxide ($TiO_2$), barium sulfate ($BaSO_4$), barium titanium oxide ($BaTiO_3$), aluminum nitride, silicon nitride, calcium fluoride, barium fluoride, zeolite, apatite, kaoline, mullite, spinel, olivine, mica, tin dioxide ($SnO_2$), indium tin oxide, oxides of transition metals, graphite, carbon, metal, and any combinations thereof.

Non-limiting examples of organic materials that may be used to form the heat-resistant particles disclosed herein are as follows: a polyimide resin, a melamine resin, a phenol resin, a polymethyl methacrylate (PMMA) resin, a polystyrene resin, a polydivinylbenzene (PDVB) resin, carbon black, graphite, and any combination thereof.

The heat-resistant particles may be round, irregularly shaped, flakes, etc. The average particle size of the heat-resistant material ranges from 0.01 to 5 microns, from 0.03 to 3 microns, from 0.01 to 2 microns, etc.

As described above, in a preferred embodiment, at least one of the heat-resistant particles added to the coating composition described herein is coated or partially-coated by the polymeric binder. In other embodiments, the heat-resistant particles may (in addition to or as an alternative to being coated or partially-coated by the polymeric binder) be coated or partially coated by a compatibilizer, e.g., a material that makes the particles more miscible with the polymeric binder. Generally, the heat-resistant particles may be coated or uncoated in any way that would not be inconsistent with the stated goals herein.

Not wishing to be bound by theory, oxidation or reduction reactions may occur during the formation stage of a lithium ion battery or during charging or discharging of a lithium ion battery, and these reactions may generate byproducts that can harm battery systems. The coating compositions described herein may slow down or may prevent oxidation reactions that could occur for uncoated polypropylene (PP) or polyethylene (PE) porous substrates, e.g., battery separators. Heat-resistant particles, e.g., particles comprising aluminum oxide ($Al_2O_3$), are chemically inert and do not undergo oxidation with an electrolyte. Oxidative stability improvement may be obtained by placing a coated side of the separator described herein facing or against the cathode or positive electrode.

(3) Added Components

The coating composition comprises at least one, or two, or three, etc. of (a) a cross-linker, (b) a low-temperature shutdown agent, (c) an adhesion agent, (d) a thickener, (e) a friction reducing agent, and (f) a high-temperature shutdown agent.

(a) Cross-Linker

In another aspect, at least one cross-linker may be added to the coating composition. The cross-linker is not so limited, and includes any compound capable of forming a connection between two or more polymer chains in the coating composition, so long as the compounds are not otherwise incompatible with the stated goals herein. For example, the cross-linker may be a compound having multiple reactive groups, e.g., epoxy groups, acrylate groups, etc. For example, the cross-linker may comprise two, three, four, five, etc. reactive groups. In some embodiments, a multi-epoxy group cross-linker is preferred.

In one preferred embodiment, the cross-linker may be part of, e.g., in the backbone of, the polymeric, oligomeric, or elastomeric material in the polymeric binder. For example, the cross-linker may be the epoxide group of the co-polymer or block co-polymer derived from a lactam as shown in FIG. 1.

The cross-linker may be added in any amount not inconsistent with the stated goals herein. In some preferred embodiments the amount of cross-linker may be added at a ppm level, e.g., up to 50,000 ppm, up to 10,000 ppm, up to 5,000 ppm, etc. with respect to the total coating composition.

When the cross-linker is added, in some embodiment, a cross-linking agent or catalyst can be added, which may initiate or catalyze cross-linking of, for example, two polymer chains, via the added cross-linker. The cross-linking agent may be sensitive to heat, light, or chemical environment (e.g., pH), e.g., the cross-linking agent or cross-linker may initiate or catalyze cross-linking of one or more polymer chains in the coating composition in response to heating, irradiation with light, or change in pH.

When a cross-linker is added to the coating composition described herein, the inventors of this application have found that the resulting coating and a battery separator comprising said coating (on one or two sides thereof) exhibit many beneficial properties. These properties include lower MD and TD shrinkage even at higher temperatures, e.g., a temperature of 180° C. A coating with higher thermal stability results when a cross-linker is added to the coating composition described herein.

Shrinkage is measured by placing a test sample, e.g., a coated porous substrate, between two sheets of paper which are then clipped together to hold the sample between the papers and suspended in an oven. For the "150° C. for 1 hour" testing, a sample is placed in an oven at 150° C. for 1 hour. After the designated heating time in the oven, each sample was removed and taped to a flat counter surface using double side sticky tape to flatten and smooth out the sample for accurate length and width measurement. Shrinkage is measured in the both the Machine direction (MD) and Transverse direction (TD) direction (perpendicular to the MD direction) and is expressed as a % MD shrinkage and % TD shrinkage. For the "180° C. for 10 minutes" testing, the sample is placed in an oven at 180° C. for 10 minutes and then tested as described above for the "150° C. for 1 hour" testing. For the "180° C. for 20 minutes" testing, the sample is placed in an oven at 180° C. for 20 minutes and then tested as described above for the "150° C. for 1 hour" testing. Shrinkage may be measured for a one-side coated porous substrate or for a two-side coated porous substrate.

(b) A Low-Temperature Shutdown Agent

In another aspect, a low-temperature shutdown agent is added to the coating compositions described herein. The type of low-temperature agent used is not so limited as long as it is not incompatible with the stated goals herein, e.g., providing a coating composition that can be used to produce safer lithium ion batteries. In some embodiments, the low-temperature shutdown agent has a melting temperature that is lower than that of the porous film on which the coating composition is (or is meant to be) applied. For example, if the porous film melts around 135° C., then the low-temperature shutdown agent has a melting temperature that is lower than 135° C.

In some embodiments, the low-temperature shutdown agent has a melting point in the range of 80° C. to 130° C., sometimes in the range of 90° C. to 120° C., sometimes in the range of 100° C. to 120° C., etc.

The low-temperature shut-down agent may be a particulate having an average particle size ranging from 0.1 to 5.0 microns, from 0.2 to 3:0 microns, from 0.3 to 1.0 microns, etc. These particles may be coated, uncoated, or partially coated.

In some preferred embodiments, the low-temperature shut down agent may be particles comprising wax, oligomer, polyethylene (PE), for example low-density PE, and/or the like. These particles may be coated, uncoated, or partially coated. For example, they may be coated with latex and/or with a polymeric binder as disclosed herein. In some embodiments, these coated low-temperature shutdown agents may be coated with a high-temperature shutdown agent described in greater detail below.

The inventors of this application have found that using a coating composition, which comprise a low-temperature shutdown agent as described herein, to coat a battery separator results in a better separator, particularly from a safety standpoint. Without wishing to be bound by any particular theory, it is believed that this improved safety results from extending the shutdown window, which is discussed further herein, so that shutdown begins at a lower temperature when compared to the shutdown window of an uncoated separator or a coated separator wherein the coating layer does not comprise a low-temperature shutdown agent.

(c) An Adhesion Agent

In another aspect, an adhesion agent may be added to the coating compositions herein. The compound used as an adhesion agent is not so limited so long as it is not incompatible with the stated goals herein. In some embodiments, adding an adhesion agent to the coatings compositions described herein results in coatings having higher adhesion to battery electrodes, e.g., lithium battery electrodes, comparted to coatings formed from similar coating compositions where the adhesion agent has not been added. The adhesion agent increases the "stickiness" and/or tack of coatings formed of the coating compositions described herein. Adhesion between the heat-resistant particles in the coating and adhesion of a coating layer formed from the coating compositions described herein to a porous substrate as described herein may also be improved. For example, the coating-to-porous substrate adhesive strength may be greater than 10 N/m, greater than 12 N/m, greater than 14 N/m, greater than 16 N/m, greater than 18 N/m, or greater than 20 N/m, even in embodiments where the porous substrate has not been pre-treated to improve coating layer adhesion. Such pre-treatments may include corona treatment, plasma treatment, stretching, surfactant treatment/coating, and any other surface treatments and/or coatings aimed at improving adhesion of the substrate to a coating layer. However, use of such pre-treatments, though not necessary to achieve excellent adhesive strength between the porous substrate and the coating layer, is not precluded. In some embodiments, the adhesion agent may be polyvinylpyrrolidone (PVP) or a thermoplastic fluoropolymer such as polyvinylidene difluoride (PVdF).

One way adhesion of the coating layer to a battery electrode is measured is as follows: A coated battery separator as described herein is place between electrodes, electrolyte is injected into the space between the electrodes, and the electrode-coated separator composite is heat-pressed at 90° C. for 12 hrs. Following this, the composite is disassembled, e.g., the separator is separated from the electrodes, and the separator is observed. If a lot of black material, which is electrode material, is observed on the separator, this indicates a higher adhesion between the separator and the electrode. Lower amounts of black material, or electrode material, indicates lower adhesion.

(d) Thickener

In another aspect, a thickener may be added to the coating compositions described herein. The thickener used is not so limited and can be any thickener not inconsistent with the goals stated herein. The thickener, in some embodiments, is added to adjust the viscosity of the coating compositions described herein. An exemplary thickener is, for example, carboxymethyl cellulose (CMC).

(e) Friction Reducing Agent

In another aspect, a friction reducing agent may be added to the coating compositions described herein. The friction reducing agent is not so limited, and can be any friction reducing agent not inconsistent with the goals stated herein.

For example, in some embodiments, the addition of the friction reducing agent can result in a lowering of pin removal force and/or lowering of the coefficient of friction when films formed from a coating composition that contains a friction reducing agent are compared to films formed from a coating compositions where the friction reducing agent is not added. In some embodiments, a coating formed from a coating composition described herein is "sticky" or adheres well to an electrode when wet, e.g., wet with electrolyte, and has good pin removal when dry. For example, in some embodiments, the pin removal force of films formed from a coating composition that contains the friction reducing agent is less than or equal to 7100 g, in some embodiments, it is less than 6500 g, in some embodiments it is less than 6000 g. In some embodiments the coefficient (static) ranging from 0.2 to 0.8, sometimes 0.3 to 0.7, sometimes 0.4 to 0.6, and sometimes 0.3 to 0.5.

The pin removal properties are quantified using the following procedure that measures the 'pin removal force (g).'

A battery winding machine was used to wind the separator (which comprises, consists of, or consists essentially of a porous substrate with a coating layer applied on at least one surface thereof) around a pin (or core or mandrel). The pin is a two (2) piece cylindrical mandrel with a 0.16 inch diameter and a smooth exterior surface. Each piece has a semicircular cross section. The separator, discussed below, is taken up on the pin. The initial force (tangential) on the separator is 0.5 kgf and thereafter the separator is wound at a rate of ten (10) inches in twenty four (24) seconds. During winding, a tension roller engages the separator being wound on the mandrel. The tension roller comprises a ⅝" diameter roller located on the side opposite the separator feed, a ¾" pneumatic cylinder to which 1 bar of air pressure is applied (when engaged), and a ¼" rod interconnecting the roller and the cylinder.

The separator consists of two (2) 30 mm (width)×10" pieces of the membrane being tested. Five (5) of these separators are tested, the results averaged, and the averaged value is reported. Each piece is spliced onto a separator feed roll on the winding machine with a 1" overlap. From the free end of the separator, i.e., distal the spliced end, ink marks are made at ½" and 7". The ½" mark is aligned with the far side of the pin (i.e., the side adjacent the tension roller), the separator is engaged between the pieces of the pin, and winding is begun with the tension roller engaged. When the 7" mark is about ½" from the jellyroll (separator wound on the pin), the separator is cut at that mark, and the free end of the separator is secured to the jellyroll with a piece of adhesive tape (1" wide, ½" overlap). The jellyroll (i.e., pin with separator wound thereon) is removed from the winding machine. An acceptable jellyroll has no wrinkles and no telescoping.

The jellyroll is placed in a tensile strength tester (i.e., Chatillon Model TCD 500-MS from Chatillon Inc., Greensboro, N.C.) with a load cell (50 lbs×0.02 lb; Chatillon DFGS 50). The strain rate is 2.5 inches per minute and data from the load cell is recorded at a rate of 100 points per second. The peak force is reported as the pin removal force.

COF (Coefficient of friction) Static is measured according to JIS P 8147 entitled "Method for Determining Coefficient of Friction of Paper and Board."

In some preferred embodiments, the friction reducing agent is a fatty acid salt. For example, the friction reducing agent may be a metallic stearate such as Li stearate, Ca stearate, etc. Other possible friction reducing agents include siloxanes, silicone resins, fluororesins waxes (e.g., paraffin wax, microcrystalline wax, low-molecular weight polyethylene, and other hydrocarbon waxes), fatty acid esters (e.g., methyl stearate, stearyl stearate, monoglyceride stearate), aliphatic amides (e.g., stearamide, palmitamide, methylene bis stearamide), and combinations of any of the aforementioned friction reducing agents.

(f) High-Temperature Shutdown Agent

According to another aspect, a high-temperature shutdown agent is added to the coating compositions described herein. The type of high-temperature agent used is not so limited as long as it is not incompatible with the stated goals herein, e.g., providing a coating composition that can be used in making safer lithium ion batteries. In some embodiments, the high-temperature shutdown agent has a melting temperature that is higher than that of the porous film on which the coating composition is (or is meant to be) applied. For example, if the porous film melts around 135° C., then the high-temperature shutdown agent has a melting temperature that is higher than 135° C.

In some embodiments, the high-temperature shutdown agent has a melting point in the range of 140° C. to 220° C., sometimes in the range of 150° C. to 200° C., sometimes in the range of 160° C. to 190° C., sometimes in the range of 170° C. to 180° C., etc.

The high-temperature shut-down agent may be a particulate having an average particle size ranging from 0.1 to 5.0 microns, from 0.2 to 3.0 microns, from 0.3 to 1.0 microns, etc. These particles may be coated, uncoated, or partially coated.

In some preferred embodiments, the high-temperature shut down agent may be particles comprising polyvinylpyrrolidone (PVP) or polyvinylidene difluoride (PVdF). These particles may be coated, uncoated, or partially coated. For example, they may be coated with latex and/or with a polymeric binder as disclosed herein. In some embodiments, these coated particles are coated with a low-temperature shutdown agent as described hereinabove.

The inventors of this application have found that using a coating composition, which comprise a high-temperature shutdown agent as described herein, to coat a battery separator results in a better separator, particularly from a safety standpoint. Without wishing to be bound by any particular theory, it is believed that this improved safety results from extending the shutdown window, which is discussed further herein, to a higher temperature compared to the shutdown window of an uncoated separator or a coated separator wherein the coating layer does not comprise a high-temperature shutdown agent.

(4) Optionally Added Components

In another aspect, one or more of the following additional components are optionally added: consisting of surfactants, antioxidants, fillers, colorants, stabilizing agents, de-foaming agents, de-bubbling agents, thickeners, emulsifiers, pH buffers, emulsification agents, surfactants, anti-settling agents, levelers, rheology modifiers, and wetting agents. Two or more, three or more, four or more, etc. of these optional additional components may also be added to the coating compositions described herein.

Separators

In another aspect, a separator comprising, consisting of, or consisting essentially of a porous substrate and a coating layer formed on at least one surface of the porous substrate is described herein. One-sided coated separators and two-side coated separators according to some embodiments herein are shown in FIG. 4.

The coating layer may comprise, consist of, or consist essentially of, and/or be formed from, any one of the coating compositions described hereinabove. The coating layer may be wet, dry, cross-linked, uncross-linked, etc. The coating may be applied over a PVD layer or a PVD layer may be applied over the coating. The coating may be applied over an adhesive layer or an adhesive layer may be applied over the coating.

A new and/or improved separator as described herein may have or exhibit one or more of the following characteristics or improvements: (1) desirable level of porosity as observed by SEMs and as measured; (2) desirable Gurley numbers to show permeability; (3) desirable thickness; (4) a desired level of coalescing of the polymeric binder such that the coating is improved relative to known coatings; (4) desirable properties due to processing of the coated separator, including, but not limited to, how the coating is mixed, how the coating is applied to the substrate, and how the coating is dried on the substrate; (5) improved thermal stability as shown, for example, by desirable behavior in hot tip hole propagation studies; (6) reduced shrinkage when used in a lithium battery, such as a lithium ion battery; (7) improved adhesion between the heat-resistant particles in the coating; (8) improved adhesion between the coating and the substrate; (9) improved adhesion between the coated separator and one or both electrodes of a battery, and/or (10) improved pin removal force and/or coefficient of friction. These objects and other related attributes of an improved coated separator are described in more detail in other parts of this application.

The new and/or improved coated separator may have excellent quality and uniformity thus providing good manufacturing yields. The new and/or improved coated separator may provide a battery with improved capacity and improved cycle capability. It may have fewer defects than other known coated separators, for example, fewer gel defects, and/or fewer crater defects. The improved and/or coated separator may have improved coating to porous substrate adhesion. The adhesive strength may be greater than 10 N/m, greater than 12 N/m, greater than 14 N/m, greater than 16 N/m, greater than 18 N/m, or greater than 20 N/m.

The new and/or improved coated porous substrate (or separator) may also have improved safety by exhibiting an extended shutdown window, particularly compared to the shutdown window of the porous substrate itself (e.g., the uncoated porous substrate or separator). The extended shutdown window of the new and/or improved separator disclosed herein may extend between about 80° C. to about 200° C., compared to a window of about 130° C. to 175° C. for the substrate itself. The extended shutdown window of the new and/or improved substrate is also steady, e.g., a constant or relatively constant resistance is measured across the separator over the entire window. For example, in some embodiments, the measured resistance across the separator remains above 10,000 ohms/cm$^2$ over the entire window. This is considered steady. Sometimes, the measured resistance across the separator even goes as high as 100,000 ohms/cm$^2$ over the extended shutdown window of the new and/or improved separator disclosed herein. Initial shutdown of the new and/or improved separator disclosed herein is also quick. Sometimes, during initial shutdown the measured resistance across the separator increases from less than 10 ohms/cm$^2$ to above 10,000 ohms/cm$^2$ as the temperature increases between 1 to 5 degrees Celsius. For example, the resistance might go from being 5 ohms/cm$^2$ at 120° C. to being above 10,000 ohms/cm$^2$ at 125° C. Sometimes a temperature increase of only 4, or 3, or 2, or 1 degree is necessary for this increase in resistance to occur.

Preferred thermal shutdown characteristics are lower onset or initiation temperature, faster or more rapid shutdown speed, and a sustained, consistent, longer or extended thermal shutdown window. In a preferred embodiment, the shutdown speed is, at a minimum, 2000 ohms ($\Omega$)·cm$^2$/second or 2000 ohms ($\Omega$)·cm$^2$/degree and the resistance across the separator increases by a minimum of two orders of magnitude at shutdown. One example of shutdown performance is shown in FIG. 5.

A shutdown window as described herein generally refers to the time/temperature window spanning from initiation or onset of shutdown, e.g., the time/temperature at which the separator first begins to melt enough to close the pores thereof resulting in stopping or slowing of ionic flow, e.g., between an anode and a cathode, and/or increase in resistance across the separator, until a time/temperature at which the separator begins to break down, e.g., decompose, causing ionic flow to resume and/or resistance across the separator to decrease. One example of an extended shutdown window as described herein is shown FIG. 6.

FIG. 6 shows that the shutdown window of a coated porous substrate according to embodiments described herein is extended compared to that of the porous substrate itself, e.g., before coating with one of the coating compositions described herein. The initiation or onset of shutdown occurs at about 135° C. for the uncoated porous substrate and occurs earlier after coating. Without wishing to be bound by any particular theory, this could result from the addition of the low-temperature shutdown agents described herein to the coating compositions and/or coatings described herein. The low-temperature shutdown agent may melt before the porous substrate, and fill or partially fill its pores, causing an early (lower temperature) initiation of shutdown. FIG. 6 also shows that the duration of shutdown is extended from 170° C. in the uncoated porous substrate to about 190° C. after coating. Without wishing to be bound by any particular theory, this could result from the addition of a high-temperature shutdown agent as described herein to the coatings and coating compositions described herein. The high-temperature shutdown agent may degrade at a higher temperatures than the porous substrate itself. In some embodiment described herein only the shutdown initiation temperature is lowered (extending the window), in other embodiments, only the high-temperature endpoint of the shutdown window is raised (extending the window), and in some embodiments both the upper and lower endpoints of the shutdown window are extended, e.g., as shown in FIG. 6.

Shutdown can be measured using Electrical Resistance testing which measures the electrical resistance of the separator membrane as a function of temperature. Electrical resistance (ER) is defined as the resistance value in ohm-cm$^2$ of a separator filled with electrolyte. Temperature may be increased during Electrical Resistance (ER) testing at a rate of 1 to 10° C. per minute. When thermal shutdown occurs in a battery separator membrane, the ER reaches a high level of resistance on the order of approximately 1,000 to 10,000 ohm-cm$^2$. A combination of a lower onset temperature of thermal shutdown and a lengthened shutdown temperature duration increases the sustained "window" of shutdown. A wider thermal shutdown window can improve battery safety by reducing the potential of a thermal runaway event and the possibility of a fire or an explosion.

One exemplary method for measuring the shutdown performance of a separator is as follows: 1) Place a few drops of electrolyte onto a separator to saturate it, and place the separator into the test cell; 2) Make sure that a heated press is below 50 C, and if so, place the test cell between the platens and compress the platens slightly so that only a light pressure is applied to the test cell (<50 lbs for a Carver "C"

press); 3) Connect the test cell to an RLC bridge and begin recording temperature and resistance. When a stable baseline is attained, then start ramping the temperature of the heated press at 10° C./min using the temperature controller; 4) Turn off the heated platens when the maximum temperature is reached or when the separator impedance drops to a low value; and 5) Open the platens and remove the test cell. Allow test cell to cool. Remove separator and dispose of.

(1) Porous Substrate

The porous substrate used in the separator described herein is not so limited, and may be any porous substrate that is not incompatible with the stated goals herein. For example, the porous substrate can be any porous substrate capable of being used as a battery separator. The porous substrate may be a macroporous substrate, a mesoporous substrate, a microporous substrate, or a nanoporous substrate. In some preferred embodiments, the porosity of the porous substrate is from 20 to 90%, from 40 to 80%, from 50 to 70%, etc. Porosity is measured using ASTM D-2873 and is defined as the percentage of void space, e.g., pores, in an area of the porous substrate, measured in the Machine Direction (MD) and the Transverse Direction (TD) of the substrate. In some embodiments, the porous substrate has a JIS Gurley of 0.5 to 1000 seconds, in some embodiments a JIS Gurley of 100 to 800 seconds, in other embodiments the porous JIS Gurley of 200 to 700 seconds, in other embodiments it is 300 to 600 seconds. Gurley is defined herein as the Japanese Industrial Standard (JIS Gurley) and is measured herein using the OHKEN permeability tester. JIS Gurley is defined as the time in seconds required for 100 cc of air to pass through one square inch of film at a constant pressure of 4.9 inches of water. In some embodiments the pores are round, e.g., a sphericity factor of 0.25 to 8.0, oblong, or oval-shaped, etc.

The material of the porous substrate is made of is not so limited. The polymers used in the porous substrate may be characterized as thermoplastic polymers. These polymers may be further characterized as semi-crystalline polymers. In one embodiment, semi-crystalline polymer may be a polymer having a crystallinity in the range of 20 to 80%. Such polymers may be selected from the following group: polyolefins, fluorocarbons, polyamides, polyesters, polyacetals (or polyoxymethylenes), polysulfides, polyvinyl alcohols, co-polymers thereof, and combinations thereof. Polyolefins may include polyethylenes (LDPE, LLDPE, HDPE, UHMWPE), polypropylene, polybutene, polymethylpentene, co-polymers thereof, and blends thereof. Fluorocarbons may include polytetrafluoroethylene (PTFE), polychlorotrifluoroethylene (PCTFE), fluorinated ethylene propylene (FEP), ethylenechlortrifluoroethylene (ECTFE), ethylene tetrafluoroethylene (ETFE), polyvinylidene fluoride (PVDF), polyvinylfluoride (PVF), prefluoroalkoxy (PFA) resin, co-polymers thereof, and blends thereof. Polyamides may include, but are not limited to: polyamide 6, polyamide 6/6, Nylon 10/10, polyphthalamide (PPA), co-polymers thereof, and blends thereof. Polyesters may include polyester terephthalate (PET), polybutylene terephthalate (PBT), poly-1-4-cyclohexylenedimethylene terephthalate (PCT), polyethylene naphthalate (PEN), and liquid crystal polymers (LCP). Polysulfides include, butare not limited to, polyphenylsulfide, polyethylene sulfide, co-polymers thereof, and blends thereof. Polyvinyl alcohols include, but are not limited to, ethylenevinyl alcohol, co-polymers thereof, and blends thereof. In some embodiments the porous substrate comprises at least one selected from the group consisting of: polyolefins (PO), e.g., polyethylene (PE), polypropylene (PP), polymethylpentene (PMP), polyethylene terephthalate (PET), Aramide, polyvinylidene fluoride (PVDF), polymer blends, polymer composites (with inorganic fillers A1203, Si02, etc.) including polymers, co-polymers, and block-polymers thereof, and blends, mixtures or combinations thereof.

The porous substrate may include other ingredients. For example, those ingredients may include: fillers (inert particulates used to reduce the cost of the porous substrate, but otherwise having no significant impact on the manufacture of the porous substrate or its physical properties), anti-static agents, anti-blocking agents, anti-oxidants, lubricants (to facilitate manufacture), and the like.

Various materials may be added to the polymers to modify or enhance the properties of the porous substrate. Such materials include, but are not limited to: (1) polyolefins or polyolefin oligomers with a melting temperature less than 130° C.; (2) Mineral fillers include, but are not limited to: calcium carbonate, zinc oxide, diatomaceous earth, talc, kaolin, synthetic silica, mica, clay, boron nitride, silicon dioxide, titanium dioxide, barium sulfate, aluminum hydroxide, magnesium hydroxide and the like, and blends thereof; (3) Elastomers include, but are not limited to: ethylene-propylene (EPR), ethylene-propylene-diene (EPDM), styrene-butadiene (SBR), styrene isoprene (SIR), ethylidene norbornene (ENB), epoxy, and polyurethane and blends thereof; (4) Wetting agents include, but are not limited to, ethoxylated alcohols, primary polymeric carboxylic acids, glycols (e.g., polypropylene glycol and polyethylene glycols), functionalized polyolefins etc; (5) Lubricants, for example, silicone, fluoropolymers, oleamide, stearamide, erucamide, calciumstearate, or other metallic stearate; (6) flame retardants for example, brominated flame retardants, ammonium phosphate, ammonium hydroxide, alumina trihydrate, and phosphate ester; (7) cross-linking or coupling agents; (8) polymer processing aid; and (9) Any types of nucleating agents including beta-nucleating agents for polypropylene. Beta-nucleated polypropylene is disclosed in U.S. Pat. No. 6,602,593. A beta nucleator for polypropylene is a substance that causes the creation of beta crystals in polypropylene.)

In some embodiments, the porous substrate is a single-layer, comprising one or more plies, a bi-layer, where each layer may comprise one or more plies, or multi-layer porous substrate, where each layer may comprise one or more plies. When the porous substrate is a multi-layer porous substrate it may comprise 3 to 10 layers, 4 to 9, 5 to 8, or 6 to 7. In some multilayer embodiments the porous substrate comprises a polypropylene (PP) layer, which comprises a majority (more than 50% of polymer component) PP, a polyethylene layer (PE), which comprises a majority PE, and another PP layer, which comprises a majority PP, in that order. In other embodiments the multi-layer porous substrate comprises a PE layer, which comprises a majority of PE, a PP, which comprises a majority PP, and another PE layer, which comprises a majority PE, in that order. The layers comprising a majority of PP or PE may comprise PP or PE in an amount more than 50% up to 100% of the polymer component, respectively.

The porous substrate may be made by any one of a wet manufacturing process, a dry manufacturing process, a particle stretch manufacturing process, and a beta-nucleated biaxially-oriented (BN-BOPP) manufacturing process The porous substrate can be manufactured by, for example, a dry stretch process (known as the Celgard® dry stretch process) of Celgard, LLC of Charlotte, N.C. The porous substrate may be any polyolefin microporous separator membrane available from Celgard, LLC of Charlotte, N.C. Alternatively, in other embodiments, the porous substrate may be manufactured by a wet process, which may involve the use of solvents and/or oils, sometimes known as a phase separation or extraction process, of Celgard Korea, Limited of South Korea, Asahi Kasei of Japan and/or Tonen of Japan. Alternatively, in other embodiments, the porous substrate can be a nonwoven type membrane.

A possibly preferred porous substrate may made by a dry-stretch process and have pores of less than 2 um. A microporous substrate, for example, is a thin, pliable, polymeric sheet, foil, or film having a plurality of pores therethrough. Such porous substrates may be used in a wide variety of applications, including, but not limited to, mass transfer membranes, pressure regulators, filtration membranes, medical devices, separators for electrochemical storage devices, membranes for use in fuel cells, and the like. The porous substrate herein is possibly preferably made by the dry-stretch process (also known as the CELGARD process). The dry stretch process refers to a process where pore formation results from stretching of the nonporous precursor. See, Kesting, R., Synthetic Polymeric Membranes, A structural perspective, Second Edition, John Wiley & Sons, New York, N.Y., (1985), pages 290-297, incorporated herein by reference. The dry-stretch process is distinguished from the wet process and particle stretch process, as discussed above.

In one embodiment, the porous may be a dry-stretched porous substrate having: 1) substantially slit, trapezoidal, or round shape pores, and 2) a ratio of machine direction tensile strength to transverse direction tensile strength in the range of 0.1 to 20, preferably 0.5 to 10. Regarding the pore shape, See, FIGS. 1-5. The round shaped pores of FIGS. 1-3 differ from the slit shaped pores of FIGS. 4-5 and Kestin, Ibid. Further, the pore shape of the instant porous substrate may be characterized by an aspect ratio, the ratio of the length to the width of the pore. In one embodiment of the instant porous substrate, the round shape pore aspect ratio ranges from 0.75 to 1.25. This is contrasted with the aspect ratio of the slit shaped pore dry-stretched membranes which are greater than 5.0. Regarding the ratio of machine direction tensile strength to transverse direction tensile strength, in one round shape pore embodiment, this ratio is from 0.5 to 5.0. This ratio differs from the corresponding ratio of the slit shape pore membranes which is greater than 10.0. Machine Direction (MD) and Transverse Direction (TD) tensile strength are measured using Instron Model 4201 according to ASTM-882 procedure. The instant porous substrate may be further characterized as follows: an average pore size in the range of 0.03 to 0.30 microns (m); a porosity in the range of 20-80%; and/or a transverse direction tensile strength of greater than 50, preferably 100, more preferably 250 Kg/cm2. The foregoing values are exemplary values and are not intended to be limiting, and accordingly should be viewed as merely representative of the instant porous substrate. Pore size is measured using the Aquapore available through Porous Materials, Inc. (PMI). Pore size is expressed in μm.

The instant porous substrate is preferably made by a dry-stretch process where a precursor is MD stretched, TD stretched, biaxially stretched (i.e., not only stretched in the MD, but also in the TD direction). This process will be discussed in greater detail below.

In general, the process for making the foregoing porous substrate includes the steps of extruding a nonporous precursor, and then MD, TD or biaxially stretching the nonporous precursor. Optionally, the nonporous precursor may be annealed prior to stretching. In one embodiment, the biaxial stretching includes a machine direction stretch and a transverse direction stretch with a simultaneous controlled machine direction relax. The machine direction stretch and the transverse direction stretch may be simultaneous or sequential. In one embodiment, the machine direction stretch is followed by the transverse direction stretch with the simultaneous machine direction relax. This sequential process is discussed in greater detail below.

Extrusion is generally conventional (conventional refers to conventional for a dry-stretch process). The extruder may have a slot die (for flat precursor) or an annular die (for parison precursor). In the case of the latter, an inflated parison technique may be employed (e.g., a blow up ratio (BUR)). However, the birefringence of the nonporous precursor does not have to be as high as in the conventional dry-stretch process. For example, in the conventional dry-stretch process to produce a porous substrate with a >35% porosity from a polypropylene resin, the birefringence of the precursor would be >0.0130; while with the instant process, the birefringence of the PP precursor could be as low as 0.0100. In another example, a porous substrate with a >35% porosity from a polyethylene resin, the birefringence of the precursor would be >0.0280; while with the instant process, the birefringence of the PE precursor could be as low as 0.0240.

Annealing (optional) may be carried out, in one embodiment, at temperatures between Tm-80° C. and Tm-10° C. (where Tm is the melt temperature of the polymer); and in another embodiment, at temperatures between Tm-50° C. and Tm-15° C. Some materials, e.g., those with high crystallinity after extrusion, such as polybutene, may require no annealing.

Machine direction stretch may be conducted as a cold stretch or a hot stretch or both, and as a single step or multiple steps. In one embodiment, cold stretching may be carried out at <Tm-50° C., and in another embodiment, at <Tm-80° C. In one embodiment, hot stretching may be carried out at <Tm-10° C. In one embodiment, total machine direction stretching may be in the range of 50-500%, and in another embodiment, in the range of 100-300%. During machine direction stretch, the precursor may shrink in the transverse direction (conventional). Transverse direction stretching following MD stretching preferably includes a simultaneous controlled machine direction relax. This means that as the precursor is stretched in the transverse direction the precursor is simultaneously allowed to contract (i.e., relax), in a controlled manner, in the machine direction. The transverse direction stretching may be conducted as a cold step, as a hot step, or a combination of both. In one embodiment, total transverse direction stretching may be in the range of 100-1200%, and in another embodiment, in the range of 200-900%. In one embodiment, the controlled machine direction relax may range from 5-80%, and in another embodiment, in the range of 15-65%. In one embodiment, transverse stretching may be carried out in multiple steps. During transverse direction stretching, the precursor may or may not be allowed to shrink in the machine direction. In an embodiment of a multi-step transverse direction stretching, the first transverse direction step may include a transverse stretch with the controlled machine relax, followed by simultaneous transverse and machine direction stretching, and followed by transverse direction relax and no machine direction stretch or relax. Optionally, the precursor, after machine direction and transverse direction stretching may be subjected to a heat setting, additional MD or TD stretching, and/or the like.

In some embodiments, the ratio of machine direction (MD) tensile strength to transverse direction (TD) tensile strength is between 0.5 to 10.0, in some embodiments 0.5 to 7.5, in some embodiments it is 0.5 to 5.0. Machine Direction (MD) and Transverse Direction (TD) tensile strength are measured using Instron Model 4201 according to ASTM-882 procedure.

In some embodiments, the porous film has a puncture strength of 400 g/mil or greater. Puncture Strength is measured using Instron Model 4442 based on ASTM D3763. The measurements are made across the width of the microporous membrane (e.g., the porous substrate or film) and the puncture strength defined as the force required to puncture the test sample (2) Coating Layer In one aspect, the coating layer may be an outermost coating layer of the separator, e.g., it may have no other different coating layers formed thereon, or the coating layer may have at least one other different coating layer formed thereon. For example, in some embodiments, a different polymeric coating layer may be coated over or on top of the coating layer formed on at least one surface of the porous substrate. In some embodiments, that different polymeric coating layer may comprise, consist of, or consist essentially of at least one of polyvinylidene difluoride (PVdF) or polycarbonate (PC).

In some embodiments, the coating layer is applied over top of one or more other coating layers that have already been applied to at least one side of the porous substrate. For example, in some embodiments, these layers that have already been applied to a porous substrate are thin, very thin, or ultra-thin layers of at least one of an inorganic material, an organic material, a conductive material, a semi-conductive material, a non-conductive material, a reactive material, or mixtures thereof. In some embodiments, these layer(s) are metal or metal oxide-containing layers. In some preferred embodiments, a metal-containing layer and a metal-oxide containing layer, e.g., a metal oxide of the metal used in the metal-containing layer, are formed on the porous substrate before a coating layer comprising a coating composition described herein is formed. Sometimes, the total thickness of these already applied layer or layers is less than 5 microns, sometimes, less than 4 microns, sometimes less than 3 microns, sometimes less than 2 microns, sometimes less than 1 micron, sometimes less than 0.5 microns, sometimes less than 0.1 microns, and sometimes less, than 0.05 microns.

In some embodiments, the thickness of the coating layer formed from the coating compositions described hereinabove, is less than about 12 μm, sometimes less than 10 μm, sometimes less than 9 μm, sometimes less than 8 μm, sometimes less than 7 μm, and sometimes less than 5 μm. In at least certain selected embodiments, the coating layer is less than 4 μm, less than 2 μm, or less than 1 μm.

The coating method is not so limited, and the coating layer described herein may be coated onto a porous substrate, e.g., as described herein, by at least one of the following coating methods: extrusion coating, roll coating, gravure coating, printing, knife coating, air-knife coating, spray coating, dip coating, or curtain coating. The coating process may be conducted at room temperature or at elevated temperatures.

The coating layer may be any one of nonporous, nanoporous, microporous, mesoporous or macroporous. The coating layer may have a JIS Gurley of 10,000 or less, 1,000 or less, 700 or less, sometimes 600 or less, 500 or less, 400 or less, 300 or less, 200 or less, or 100 or less. For a nonporous coating layer, the JIS Gurley can be 800 or more, 1,000 or more, 5,000 or more, or 10,000 or more (i.e., "infinite Gurley") For a nonporous coating layer, although the coating is nonporous when dry, it is a good ionic conductor, particularly when it becomes wet with electrolyte.

Composite, Vehicle, or Device

A composite comprising any separator as described hereinabove and one or more electrodes, e.g., an anode, a cathode, or an anode and a cathode, provided in direct contact therewith. The type of electrodes are not so limited. For example the electrodes can be those suitable for use in a lithium ion secondary battery.

A lithium-ion battery according to some embodiments herein is shown in FIG. 7.

A suitable anode can have an energy capacity greater than or equal to 372 mAh/g, preferably ≥700 mAh/g, and most preferably ≥1000 mAH/g. The anode be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode is not made solely from intercalation compounds containing lithium or insertion compounds containing lithium.

A suitable cathode may be any cathode compatible with the anode and may include an intercalation compound, an insertion compound, or an electrochemically active polymer. Suitable intercalation materials includes, for example, $MoS_2$, $FeS_2$, $MnO_2$, $TiS_2$, $NbSe_3$, $LiCoO_2$, $LiNiO_2$, $LiMn_2O_4$, $V_6O_{13}$, $V_2O_5$, and $CuCl_2$. Suitable polymers include, for example, polyacetylene, polypyrrole, polyaniline, and polythiopene.

Any separator described hereinabove may be incorporated to any vehicle, e.g., an e-vehicle, or device, e.g., a cell phone or laptop, that is completely or partially battery powered.

Various embodiments of the invention have been described in fulfillment of the various objects of the invention. It should be recognized that these embodiments are merely illustrative of the principles of the present invention. Numerous modifications and adaptations will be readily apparent to those skilled in the art without departing from the spirit and scope of this invention.

EXAMPLES (1) At least the following coating compositions are envisioned:

TABLE 1

| CJ | CM | CS | a | b | c | d | e | f |
|----|----|----|---|---|---|---|---|---|
| X  |    |    |   |   |   |   |   |   |
| X  | X  |    |   |   |   |   |   |   |
| X  | X  |    |   |   |   |   |   |   |
| X  | X  | X  |   |   |   |   |   |   |
| X  | X  | X  | X |   |   |   |   |   |
| X  | X  | X  | X | X |   |   |   |   |
| X  | X  | X  | X | X | X |   |   |   |
| X  | X  | X  | X | X | X | X |   |   |
| X  | X  | X  | X | X | X | X | X |   |
| X  | X  | X  | X | X | X | X | X | X |
| X  |    |    |   |   |   |   |   |   |
| X  |    | X  |   |   |   |   |   |   |
| X  |    | X  | X |   |   |   |   |   |
| X  |    | X  | X | X |   |   |   |   |
| X  |    | X  | X | X | X |   |   |   |
| X  |    | X  | X | X | X | X |   |   |
| X  |    | X  | X | X | X | X | X |   |
| X  |    | X  | X | X | X | X | X | X |
| X  |    | X  |   |   |   |   |   |   |

TABLE 1-continued

| CJ | CM | CS | a | b | c | d | e | f |
|---|---|---|---|---|---|---|---|---|
| X | X | X |   |   |   |   |   |   |
| X | X | X | X |   |   |   |   |   |
| X | X | X | X | X |   |   |   |   |
| X | X | X | X | X | X |   |   |   |
| X | X | X | X | X | X | X |   |   |
| X | X | X | X | X | X | X | X |   |
| X | X | X | X | X | X | X | X | X |
| X |   | X |   |   |   |   |   |   |
| X |   | X | X |   |   |   |   |   |
| X |   | X | X | X |   |   |   |   |
| X |   | X | X | X | X |   |   |   |
| X |   | X | X | X | X | X |   |   |
| X |   | X | X | X | X | X | X |   |
| X |   | X | X | X | X | X | X | X |
| X |   |   | X |   |   |   |   |   |
| X |   |   | X | X |   |   |   |   |
| X |   |   | X | X | X |   |   |   |
| X |   |   | X | X | X | X |   |   |
| X |   |   | X | X | X | X | X |   |
| X |   |   | X | X | X | X | X | X |
| X |   |   |   | X |   |   |   |   |
| X |   |   |   | X | X |   |   |   |
| X |   |   |   | X | X | X |   |   |
| X |   |   |   | X | X | X | X |   |
| X |   |   |   | X | X | X | X | X |
| X |   |   |   |   | X |   |   |   |
| X |   |   |   |   | X | X |   |   |
| X |   |   |   |   | X | X | X |   |
| X |   |   |   |   | X | X | X | X |
| X |   |   |   |   |   | X |   |   |
| X |   |   |   |   |   | X | X |   |
| X |   |   |   |   |   | X | X | X |
| X |   |   |   |   |   |   | X |   |
| X |   |   |   |   |   |   | X | X |
| X |   |   |   |   |   |   |   | X |
|   | X |   |   |   |   |   |   |   |
|   | X | X |   |   |   |   |   |   |
|   | X | X | X |   |   |   |   |   |
|   | X | X | X | X |   |   |   |   |
|   | X | X | X | X | X |   |   |   |
|   | X | X | X | X | X | X |   |   |
|   | X | X | X | X | X | X | X |   |
|   | X | X | X | X | X | X | X | X |
|   | X |   | X |   |   |   |   |   |
|   | X |   | X | X |   |   |   |   |
|   | X |   | X | X | X |   |   |   |
|   | X |   | X | X | X | X |   |   |
|   | X |   | X | X | X | X | X |   |
|   | X |   | X | X | X | X | X | X |
|   | X |   |   | X |   |   |   |   |
|   | X |   |   | X | X |   |   |   |
|   | X |   |   | X | X | X |   |   |
|   | X |   |   | X | X | X | X |   |
|   | X |   |   | X | X | X | X | X |
|   | X |   |   |   | X |   |   |   |
|   | X |   |   |   | X | X |   |   |
|   | X |   |   |   | X | X | X |   |
|   | X |   |   |   | X | X | X | X |
|   | X |   |   |   |   | X |   |   |
|   | X |   |   |   |   | X | X |   |
|   | X |   |   |   |   | X | X | X |
|   | X |   |   |   |   |   | X |   |
|   | X |   |   |   |   |   | X | X |
|   | X |   |   |   |   |   |   | X |
|   |   | X |   |   |   |   |   |   |
|   |   | X | X |   |   |   |   |   |
|   |   | X | X | X |   |   |   |   |
|   |   | X | X | X | X |   |   |   |
|   |   | X | X | X | X | X |   |   |
|   |   | X | X | X | X | X | X |   |
|   |   | X | X | X | X | X | X | X |
|   |   | X |   | X |   |   |   |   |
|   |   | X |   | X | X |   |   |   |
|   |   | X |   | X | X | X |   |   |
|   |   | X |   | X | X | X | X |   |
|   |   | X |   | X | X | X | X | X |
|   |   | X |   |   | X |   |   |   |
|   |   | X |   |   | X | X |   |   |
|   |   | X |   |   | X | X | X |   |
|   |   | X |   |   | X | X | X | X |
|   |   | X |   |   |   | X |   |   |
|   |   | X |   |   |   | X | X |   |
|   |   | X |   |   |   | X | X | X |
|   |   | X |   |   |   |   | X |   |
|   |   | X |   |   |   |   | X | X |
|   |   | X |   |   |   |   |   | X |

CJ-heat-resistant particles, binder comprising a polymer derived from a lactam, optionally with water, an aqueous solvent, or a non-aqueous solvent as a solvent.
CM-heat-resistant particles and PVA binder, optionally with water, an aqueous solvent, or a non-aqueous solvent as a solvent.
CS-heat-resistant particles with an acrylic binder, optionally with water, an aqueous solvent, or a non-aqueous solvent as a solvent
a-any cross-linker described herein
b-any low-temperature shutdown agent described herein
c-any adhesion agent described herein
d-any thickener described herein
e-any friction reducing agent described herein
f-any high-temperature shutdown agent described herein (1) Exemplary Improved Shutdown Embodiments As discussed hereinabove, adding a low-temperature shutdown agent and/or a high-temperature shutdown agent may extend the shutdown window of a coated separator, compared to its uncoated counterpart or a coated counterpart, wherein the coating does not comprise a low-temperature shutdown agent and/or a high/temperature shutdown agent.

(a) In one exemplary embodiment, a coated battery separator (Inventive Example) according to some embodiments described herein was prepared. The coating composition comprises CJ and polyethylene beads as a low-temperature shutdown agent (b), and was coated on a trilayer porous substrate comprising a polypropylene (PP) layer, a polyethylene (PE) layer, and a polypropylene (PP) layer. The shutdown characteristics of this coated battery separator were evaluated according to Electrical Resistance testing as described herein and compared with those of the trilayer porous substrate itself (i.e., an uncoated Comparative Example). The results are shown in FIG. 8. FIG. 8 shows that the shutdown window of the Comparative Example is from about 125° C. to about 175° C. When the coating is applied, the lower endpoint of the shutdown window is shifted from about 125° C. to about 95° C., i.e., a shift of about 30° C. The upper endpoint of the shutdown window for the Inventive and Comparative Examples is about the same. Thus, overall, the shutdown window of the Inventive Example is extended by almost 30° C., resulting in a much safer battery separator.

(b) In another exemplary embodiment, a coated separator (Inventive Example) is prepared, whose coating comprises CJ and PVDF as a high-temperature shutdown agent (f). The porous substrate for this Example is the same as that described in example 2(a) hereinabove. The shutdown window of this coated separator (Inventive Example) was evaluated according to Electric Resistance testing as described herein, and compared to the uncoated trilayer porous substrate or separator (Comparative Example). The results are presented in FIG. 9. In this embodiment, the shutdown window of the Inventive Example is lowered by about 5° C. and the upper endpoint of the shutdown window is extended to >180° C., e.g., a resistance of greater than 10,000 $\Omega \cdot cm^2$ is obtained at temperatures >180° C., which results in a very safe battery.

(c) In another exemplary embodiment, two coated separators were prepared by coating multilayer (trilayer) porous substrates comprising PP-PE-PP and PE-PP-PE with a coating comprising CJ and polyvinylpyrrolidone (PVP), e.g., a high-temperature shutdown agent, on one side of the porous substrates. The coatings were 3 microns thick. These are the Inventive Examples. The shutdown window of these coated separators (Inventive Example shown in FIG. 10B) were evaluated according to Electric Resistance testing as described herein, and compared to the uncoated multilayer (trilayer) porous substrates comprising PP-PE-PP and PE-PP-PE, respectively (Comparative Examples shown in FIG. 10A and FIG. 10C). Extended shutdown characteristics beyond 190° C. were observed for both the one-side coated PP-PE-PP porous substrate and for the one-side coated PE-PP-PE substrate.

(3) Exemplary Improved Shrinkage Embodiments (a) The addition of at least thickeners and/or cross-linkers to the coating compositions described herein reduces shrinkage of separators comprising a coating layer made from these coating compositions, including at high temperature. In Table 2 below, a coating composition comprising CS only, CS and d (a thickener), and CS, d, and a (a cross-linker) were prepared. In these compositions, CS and the thickener are identical in these compositions. CS and the thickener Shrinkage is measured in the both the Machine direction (MD) and Transverse direction (TD) direction and is expressed as a % MD shrinkage and % TD shrinkage. For the "180° C. for 10 minutes" testing, the sample is placed in an oven at 180° C. for 10 minutes and then tested as described above for the "150° C. for 1 hour" testing. For the "180° C. for 20 minutes" testing, the sample is placed in an oven at 180° C. for 20 minutes and then tested as described above for the "150° C. for 1 hour" testing. Shrinkage may be measured for a one-side coated porous substrate or for a two-side coated porous substrate.

Thickness is measured in micrometers, μm, using the Emveco Microgage 210-A micrometer thickness tester and test procedure ASTM D374.

TABLE 2

| SAMPLE | | CS One-sided | CS Two-side | CSd One-sided | CSd Two-sided | CSda One-sided | CSda Two-sided |
|---|---|---|---|---|---|---|---|
| Thickness of Separator (μm) | | 19.993 | 24.773 | 18.103 | 22.403 | 18.663 | 24.57 |
| 150° C. 1h (%) | MD | 29.53 | 1.39 | 6.73 | 0.81 | 2.73 | 0.68 |
|  | TD | 1.28 | 0.45 | 1.13 | 0.15 | 1.85 | 0.07 |
| 180° C. 10 min. | MD | Not measurable | 4.91 | 50.55 | 1.76 | 46.30 | 1.35 |
| (%) | TD | Not measurable | 6.11 | 0.63 | 1.53 | 5.11 | 0.90 |
| 180° C. 20 min. | MD | Not measurable | 4.73 | Not measrable | 0.38 | 50.10 | 0.77 |
| (%) | TD | Not measurable | 3.61 | Not measrable | 0.30 | 2.31 | 0.59 |

(4) Exemplary Improved Coating Layer-to-Electrode Adhesion Embodiments

As discussed hereinabove, adding an adhesion agent to the coating compositions described herein increases adhesion of the coating layer to an electrode, e.g., an anode.

(a) An Inventive Example identical to that prepared in section 2(b) hereinabove was prepared. Adhesion of the coating layer of this Example to an anode was evaluated as described herein. The results are shown in FIG. 11. FIG. 11 shows that a lot of electrode material, i.e., from the anode, was transferred to the separator, indicating good adhesion between the coating layer and the anode.

(5) Exemplary Improved Coating Layer-to-Porous Substrate Adhesive Strength Embodiments As discussed hereinabove, adding an adhesion agent to the coating compositions described herein increases adhesion of the coating layer to the porous substrate, without pre-treating the porous substrate.

(6) Exemplary Improved Pin Removal Force Embodiments

As discussed hereinabove, for example, addition of a friction reducing agent to the coating compositions described herein may improve pin removal force of coating layers (and separators comprising such coating layers).

Inventive Examples from section 2(c) hereinabove (Inventive Examples, i.e., one-side coated PP-PE-PP porous substrates and one-side coated PE-PP-PE porous substrate) were compared to an uncoated PP-PE-PP porous substrate (Control). The pin removal test described herein was performed three times to collect three data points, and the data is reported in Table 3 below.

TABLE 3

| Sample ID: | Control | One-side Coated PP-PE-PP Porous Substrate | One-side Coated PP-PE-PP Porous Substrate |
|---|---|---|---|
| Data: 1 | 3082 | 3427 | 1742 |
| Data: 2 | 2660 | 3470 | 1758 |
| Data: 3 | 2618 | 3437 | 1690 |
| AVG (gf) | 2787 | 3445 | 1730 |
| STDEV | 257 | 23 | 36 |
| MAX (gf) | 3082 | 3470 | 1758 |
| MIN (gf) | 2618 | 3427 | 1690 |
| COUNT | 3 | 3 | 3 |
| % PRF |  | 24% | −38% |

(7) Exemplary Improved Hot Tip Test Embodiments

As discussed hereinabove, the separators disclosed herein have improved thermal stability as shown, for example, by desirable behavior in hot tip hole propagation studies. The hot tip test measures the dimensional stability of the separators under point heating condition. The test involves contacting the separators with a hot soldering iron tip and measuring the resulting hole. Smaller holes are more desirable.

(a) The hot tip test was performed on the embodiments from section 2(c) hereinabove, and the results are reported in Table 4 below and FIG. 12. It was found that the one-side coated PE-PP-PE and PP-PE-PP substrates (Inventive Examples) performed better (smaller holes) than the uncoated control, which was an uncoated PP-PE-PP porous substrate (Control).

TABLE 4

|  | Control | One-side Coated PP-PE-PP Porous Substrate | One-side Coated PP-PE-PP Porous Substrate |
| --- | --- | --- | --- |
| Run: 1 |  | 0.681 | 0.683 |
| Run: 2 |  | 0.657 | 0.644 |
| Run: 3 |  | 0.565 | 0.688 |
| Average (mm) | 3.669 | 0.634 | 0.672 |

Selected aluminum oxide coatings on the separator can be fabricated by a physical vapor deposition (PVD) process. Major advantages of PVD process over other conventional coating techniques include the following:
Roll to roll production; can be produced hundreds of meters/minute;
Homogeneous, uniform coating with complete coverage;
Binder-free coating with less/no defects;
Thickness tunable from a few nanometers to micron thick.

Referring to FIG. 13, one example of an inventive separator 20 is shown. Separator 20 comprises a ceramic composite layer or coating 22 and a polymeric microporous layer 24. The ceramic composite layer is, at least, adapted for preventing shrinkage, oxidation, electronic shorting (e.g. direct or physical contact of the anode and the cathode), and/or blocking dendrite growth. The polymeric microporous layer may be and is preferably adapted for at least preventing direct or physical contact of the anode and the cathode under normal conditions, supporting desired battery performance, and/or blocking (or shutting down) ionic conductivity (or flow) between the anode and the cathode at high temperature to prevent or stop thermal runaway. Under typical operating conditions, the ceramic composite layer 22 of separator 20 must be sufficiently conductive to allow ionic flow between the anode and cathode, so that current, in desired quantities, may be generated by the cell. The layers 22 and 24 should adhere well to one another, i.e. unintended separation should not occur. The layers 22 and 24 may be formed by lamination, co-extrusion, PVD, or coating processes. Ceramic composite layer 22 may be a coating or a discrete layer, either having a thickness ranging from 0.001 micron to 50 microns, preferably in the range of 0.01 micron to 25 microns, more preferably in the range of 0.50 micron to 10 microns (and if the separator is two side coated then possibly preferably in the range of 0.25 micron to 5 microns on each side). Polymeric microporous layer 24 is preferably a discrete membrane having a thickness ranging from 1 microns to 50 microns, preferably in the range of 2 microns to 25 microns, and more preferably from 3 to microns to 12 microns. The overall thickness of separator 20 is in the range of 1 micron to 100 microns, preferably in the range of 2 microns to 50 microns, and more preferably in the range of 3 microns to 25 microns.

Ceramic composite layer 22 comprises a matrix material or binder 26 having particles 28 such as inorganic or ceramic particle dispersed therethrough. Ceramic composite layer 22 is porous or nonporous (it being understood that some matrix or binder materials swell and gell in electrolyte and can transport ions even if the dry separator has a high Gurley (even at 1,000 or at 10,000 Gurley) before being wet or wet out with electrolyte), and ion conductivity of layer 22 is primarily dependent upon choice of the porosity, electrolyte, matrix material 26, and particles 28. The matrix material 26 or particles 28 of layer 22 may each be one component of a separator which, in part, prevents electronic shorting by preventing dendrite growth and by keeping the electrodes spaced apart at high temperature. The matrix material 26 may, in addition, also serve as a gel electrolyte or polymer electrolyte (e.g. carry the electrolyte salt). The matrix material 26 preferably comprises about 0.5-95% by weight of the ceramic composite layer 22, and the inorganic particles 28 preferably form approximately 5-95.5% by weight of the layer 22. Preferably, composite layer 22 contains inorganic particles 10%-99% by weight. Most preferably, composite layer 22 contains inorganic particles 20%-98% by weight.

The matrix material 26 may be ionically conductive or non-conductive, such as solvent or aqueous based polymers or binders such as PVDF, acrylics, polyamide, and/or any gel forming polymer suggested for use in lithium polymer batteries or in solid electrolyte batteries, copolymers thereof, and combinations, co-polymers, blends, or mixtures thereof. The matrix material 26 may be selected from, for example, polyethylene oxide (PEO), polyvinylidene fluoride (PVDF), polytetrafluoroethylene (PTFE), polyurethane, polyacrylonitrile (PAN), polymethylmethacrylate (PMMA), polytetraethylene glycol diacrylate, copolymers thereof, and mixtures thereof. The preferred matrix material is PVDF and/or PEO and their copolymers. The PVDF copolymers include PVDF:HFP (polyvinylidene fluoride:hexafluoropropylene) and PVDF:CTFE (polyvinylidene fluoride:chlorotrifluoroethylene). Most preferred matrix materials include PVDF:CTFE with less than 23% by weight CTFE, PVDH:HFP with less than 28% by weight HFP, any type of PEO, and combinations, blends, mixtures or co-polymers thereof.

The inorganic particles 28 are normally considered non-conductive, however, these particles, when in contact with the electrolyte, may develop a conductive or superconductive surface which improves the conductivity (reduces resistance) of the separator 20. The inorganic particles 28 may be selected from, for example, silicon dioxide (SiO2), aluminum oxide (Al2O3), boehmite, kaolin, clay, barium sulfate, calcium carbonate (CaCO3), titanium dioxide (TiO2), SiS2, SiPO4, and the like, or combinations, blends or mixtures thereof. The preferred inorganic particle may be boehmite, kaolin, SiO2, Al2O3, barium sulfate, and/or CaCO3. The particles may have an average particle size in the range of 0.001 micron to 25 microns, preferably in the range of 0.01 micron to 2 microns, and most preferably in the range of 0.05 micron to 0.5 microns.

The microporous polymeric layer 24 may be any of several types of microporous membranes (e.g. single ply or multi-ply), sheets, films or layers, for example, those microporous polyolefin products produced by Celgard, LLC of Charlotte, N.C., Asahi Kasei Corp. of Tokyo, Japan, and/or the like. The layer 24 may have a porosity in the range of 10-90%, preferably in the range of 20-80%. The layer 24 may have an average pore size in the range of 0.001 to 2 microns, preferably in the range of 0.05 to 0.5 micron. The layer 24 may have a Gurley Number in the range of 5 to 150 sec, preferably 10 to 80 sec. (Gurley Number refers to the time it takes for 10 cc of air at 12.2 inches of water to pass through one square inch of membrane.) The layer 24 is preferably polyolefinic. Preferred polyolefins include polyethylene and polypropylene, or combinations, blends, co-polymers, block co-polymers, or mixtures thereof.

Various embodiments of the present invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A coating composition comprising:
   a polymeric binder comprises water as the solvent, an aqueous solvent, or a non-aqueous solvent;
   heat-resistant particles; and at least one component selected from the group consisting of a cross-linker, a low-temperature shutdown agent, an adhesion agent, a thickener, a friction reducing agent, and a high-temperature shutdown agent;

wherein the polymeric binder comprises a polylactam of Formula (1):

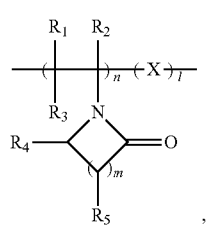

wherein $R_1$, $R_2$, $R_3$, and $R_4$ can be alkyl or aromatic substituents and $R_5$ can be alkyl, aryl, or fused ring; and wherein the polylactam can be a homopolymer or a co-polymer where co-polymeric group X can be derived from vinyl, a substituted or un-substituted alkyl vinyl, vinyl alcohol, vinyl acetate, acrylic acid, alkyl acrylate, acrylonitrile, maleic anhydride, maleic imide, styrene, polyvinylpyrrolidone (PVP), polyvinylvalerolactam, polyvinylcaprolactam (PVCap), polyamide, or polyimide;

wherein m can be an integer between 1 and 10, and wherein the ratio of 1 to n is such that $0 \leq 1:n \leq 10$.

2. A coating composition comprising:

a polymeric binder comprises water as the solvent, an aqueous solvent, or a non-aqueous solvent;

heat-resistant particles; and at least one component selected from the group consisting of a cross-linker, a low-temperature shutdown agent, an adhesion agent, a thickener, a friction reducing agent, and a high-temperature shutdown agent;

wherein the polymeric coating comprises a polylactam according to Formula (2) and a catalyst:

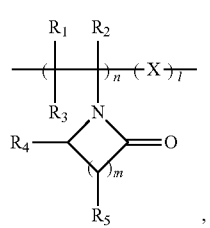

wherein $R_1$, $R_2$, $R_3$, and $R_4$ can be alkyl or aromatic substituents;

$R_5$ can be alkyl, aryl, or fused ring;

m can be an integer between 1 and 10, and wherein the ratio of 1 to n is such that $0 \leq 1:n \leq 10$, and X is an epoxide or an alkyl amine.

3. The coating composition of claim 2 wherein X is an epoxide and the catalyst comprises an alkyl amine or epoxide.

4. The coating composition of claim 1 wherein the heat-resistant particles comprise an organic material or a mixture of an organic material and an inorganic material, and the organic material is at least one selected from the group consisting of: a polyimide resin, a melamine resin, a phenol resin, a polymethyl methacrylate (PMMA) resin, a polystyrene resin, a polydivinylbenzene (PDVB) resin, carbon black, and graphite.

5. The coating composition of claim 4 wherein the ratio of heat-resistant particles to binder in the coating composition is 50:50 to 99:1.

6. The coating composition of claim 4 wherein 0.01 to 99.99% of the surface area of at least one of the heat-resistant particles is coated by the binder.

7. The coating composition of claim 1 wherein the cross-linker comprising multiple reactive groups.

8. The coating composition of claim 7 wherein the cross-linker is an epoxy cross-linker comprising multiple reactive epoxy groups.

9. The coating composition of claim 7 wherein the cross-linker is an acrylate cross-linker comprises multiple reactive acrylate groups.

10. The coating composition of claim 1 wherein the low-temperature shutdown agent comprises at least one of polyethylene (PE) and polyvinyl pyrrolidone (PVP).

11. The coating composition of claim 1 wherein the adhesion agent comprises a thermoplastic fluoropolymer.

12. The coating composition of claim 1 wherein the friction reducing agent is at least one selected from a metallic stearate, a siloxane, a silicone resin, a fluororesin, a wax, and an aliphatic amide.

13. The coating composition of claim 1 wherein the high-temperature shutdown agent has a melting point of 140 to 220° C.

14. The coating composition of claim 1 wherein the high-temperature shutdown agent is selected from polyvinylpyrrolidone (PVP) or polyvinylidene difluoride (PVDF).

15. A separator comprising a porous substrate and a coating layer formed on at least one surface of the porous substrate, wherein the coating layer comprises a coating composition of claim 1 and the coating layer further comprises another different coating layer formed thereon.

16. A secondary lithium ion battery comprising the separator of claim 15.

17. A composite comprising the separator of claim 15 in direct contact with an electrode for a secondary lithium ion battery.

18. A vehicle or device comprising the secondary lithium ion battery of claim 16.

19. The coating composition of claim 2 wherein the heat-resistant particles comprise an organic material or a mixture of an organic material and an inorganic material, and the organic material is at least one selected from the group consisting of: a polyimide resin, a melamine resin, a phenol resin, a polymethyl methacrylate (PMMA) resin, a polystyrene resin, a polydivinylbenzene (PDVB) resin, carbon black, and graphite.

20. The coating composition of claim 19 wherein the ratio of heat-resistant particles to binder in the coating composition is 50:50 to 99:1.

21. The coating composition of claim 19 wherein 0.01 to 99.99% of the surface area of at least one of the heat-resistant particles is coated by the binder.

22. The coating composition of claim 2 wherein the cross-linker comprising multiple reactive groups.

23. The coating composition of claim 22 wherein the cross-linker is an epoxy cross-linker comprising multiple reactive epoxy groups.

24. The coating composition of claim 22 wherein the cross-linker is an acrylate cross-linker comprises multiple reactive acrylate groups.

25. The coating composition of claim 2 wherein the low-temperature shutdown agent comprises at least one of polyethylene (PE) and polyvinyl pyrrolidone (PVP).

26. The coating composition of claim 2 wherein the adhesion agent comprises a thermoplastic fluoropolymer.

27. The coating composition of claim 2 wherein the friction reducing agent is at least one selected from a metallic stearate, a siloxane, a silicone resin, a fluororesin, a wax, and an aliphatic amide.

28. The coating composition of claim 2 wherein the high-temperature shutdown agent has a melting point of 140 to 220° C.

29. The coating composition of claim 2 wherein the high-temperature shutdown agent is selected from polyvinylpyrrolidone (PVP) or polyvinylidene difluoride (PVDF).

30. A separator comprising a porous substrate and a coating layer formed on at least one surface of the porous substrate, wherein the coating layer comprises a coating composition of claim 2 and the coating layer further comprises another different coating layer formed thereon.

31. A secondary lithium ion battery comprising the separator of claim 30.

32. A composite comprising the separator of claim 30 in direct contact with an electrode for a secondary lithium ion battery.

33. A vehicle or device comprising the secondary lithium ion battery of claim 31.

\* \* \* \* \*